United States Patent
Zhang et al.

(10) Patent No.: US 12,008,462 B2
(45) Date of Patent: Jun. 11, 2024

(54) SYSTEMS AND METHODS FOR PROVIDING FLEXIBLE, MULTI-CAPACITY MODELS FOR USE OF DEEP NEURAL NETWORKS IN MOBILE DEVICES

(71) Applicant: BOARD OF TRUSTEES OF MICHIGAN STATE UNIVERSITY, East Lansing, MI (US)

(72) Inventors: Mi Zhang, Okemos, MI (US); Biyi Fang, Lansing, MI (US); Xiao Zeng, Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 434 days.

(21) Appl. No.: 17/267,467

(22) PCT Filed: Aug. 9, 2019

(86) PCT No.: PCT/US2019/046011
§ 371 (c)(1),
(2) Date: Feb. 9, 2021

(87) PCT Pub. No.: WO2020/033898
PCT Pub. Date: Feb. 13, 2020

(65) Prior Publication Data
US 2021/0295174 A1    Sep. 23, 2021

Related U.S. Application Data

(60) Provisional application No. 62/716,812, filed on Aug. 9, 2018.

(51) Int. Cl.
*G06N 3/063*    (2023.01)
*G06F 18/20*    (2023.01)
(Continued)

(52) U.S. Cl.
CPC ......... *G06N 3/063* (2013.01); *G06F 18/2148* (2023.01); *G06F 18/285* (2023.01);
(Continued)

(58) Field of Classification Search
CPC ........ G06N 3/063; G06N 3/045; G06N 3/082; G06N 3/10; G06V 20/40; G06V 10/95; G06F 18/2148; G06F 18/285
See application file for complete search history.

(56) References Cited

U.S. PATENT DOCUMENTS

2011/0305392 A1    12/2011    Kapoor et al.
2016/0358068 A1 *  12/2016    Brothers ................ G06N 3/082
(Continued)

FOREIGN PATENT DOCUMENTS

EP    3306500 A1    4/2018

OTHER PUBLICATIONS

Yang, Tien-Ju, et al. "NetAdapt: Platform-Aware Neural Network Adaptation for Mobile Applications." arXiv preprint arXiv:1804.03230 (2018). (Year: 2018).*
(Continued)

*Primary Examiner* — Eric Nilsson
(74) *Attorney, Agent, or Firm* — Quarles & Brady LLP

(57) ABSTRACT

Systems and methods are disclosed which allow mobile devices, and other resource constrained applications, to more efficiently and effectively utilize deep learning neural networks using only (or primarily) local resources. These systems and methods take the dynamics of runtime resources into account to enable resource-aware, multi-tenant on-device deep learning for artificial intelligence functions for use in tasks like mobile vision systems. The multi-capacity framework enables deep learning models to offer flexible resource-accuracy trade-offs and other similar balancing of performance and resources consumed. At run-
(Continued)

time, various systems disclosed herein may dynamically select the optimal resource-accuracy trade-off for each deep learning model to fit the model's resource demand to the system's available runtime resources and the needs of the task being performed by the model. In doing so, systems and methods disclosed herein can efficiently utilize the limited resources in mobile systems to maximize performance of multiple concurrently running neural network-based applications.

21 Claims, 13 Drawing Sheets

(51) Int. Cl.
    G06F 18/214    (2023.01)
    G06N 3/045    (2023.01)
    G06N 3/082    (2023.01)
    G06N 3/10    (2006.01)
    G06V 10/94    (2022.01)
    G06V 20/40    (2022.01)

(52) U.S. Cl.
    CPC ............ *G06N 3/045* (2023.01); *G06N 3/082* (2013.01); *G06N 3/10* (2013.01); *G06V 10/95* (2022.01); *G06V 20/40* (2022.01)

(56) References Cited

U.S. PATENT DOCUMENTS

| | | |
|---|---|---|
| 2018/0137941 A1 | 5/2018 | Chen |
| 2018/0150695 A1* | 5/2018 | Guttmann ............. G06V 20/40 |
| 2018/0158552 A1 | 6/2018 | Liu et al. |
| 2018/0189666 A1 | 7/2018 | Paluri et al. |
| 2018/0197068 A1 | 7/2018 | Narayanaswami et al. |

OTHER PUBLICATIONS

Kim, Eunwoo, Chanho Ahn, and Songhwai Oh. "NestedNet: Learning Nested Sparse Structures in Deep Neural Networks." arXiv preprint arXiv:1712.03781 (2017). (Year: 2017).*

Anwar et al., Structured Pruning of Deep Convolutional Neural Networks, ACM Journal on Emerging Technologies in Computing Systems (JETC), 2017, 13(3):1-18.

Bahl et al., Vision: Cloud-Powered Sight for All: Showing the Cloud What You See, In Proceedings of the Third ACM Workshop on Mobile Cloud Computing and Services, 2012, pp. 53-60.

Han et al., Deep Compression: Compressing Deep Neural Networks with Pruning, Trained Quantization and Huffman Coding, arXiv:1510.00149v5, 2016, 14 pages.

Han et al., Learning Both Weights and Connections for Efficient Neural Networks, arXiv:1506.02626v3, 2015, 9 pages.

Han et al., MCDNN: An Approximation-Based Execution Framework for Deep Stream Processing Under Resource Constraints, In Proceedings of the 14th Annual International Conference on Mobile Systems, Applications, and Services, 2016, pp. 123-136.

He et al., Deep Residual Learning for Image Recognition, In Proceedings of the IEEE Conference on Computer Vision and Pattern Recognition, 2016, pp. 770-778.

Howard et al., MobileNets: Efficient Convolutional Neural Networks for Mobile Vision Applications, arXiv:1704.04861v1, 2017, 9 pages.

Huh et al., What Makes ImageNet Good for Transfer Learning?, arXiv:1608.08614v2, 2016, 10 pages.

Huynh et al., DeepMon: Mobile GPU-based Deep Learning Framework for Continuous Vision Applications, In Proceedings of the 15th Annual International Conference on Mobile Systems, Applications, and Services, 2017, pp. 82-95.

Kim et al., NestedNet: Learning Nested Sparse Structures in Deep Neural Networks, In Proceedings of the IEEE Conference on Computer Vision and Pattern Recognition, 2018, pp. 8669-8678.

Krizhevsky, Learning Multiple Layers of Features from Tiny Images, Apr. 8, 2009, 60 pages.

Krizhevsky et al., ImageNet Classification with Deep Convolutional Neural Networks, In Proceedings of the 25th International Conference on Neural Information Processing Systems, 2012, pp. 1097-1105.

Lane et al., DeepX: A Software Accelerator for Low-Power Deep Learning Inference on Mobile Devices, In 2016 15th ACM/IEEE International Conference on Information Processing in Sensor Networks (IPSN), pp. 1-12.

Levi et al., Age and Gender Classification Using Convolutional Neural Networks, In Proceedings of the IEEE Conference on Computer Vision and Pattern Recognition Workshops, 2015, pp. 34-42.

Li et al., Pruning Filters for Efficient ConvNets, arXiv:1608.08710v3, 2017, 13 pages.

LiKamWa et al., Starfish: Efficient Concurrency Support for Computer Vision Applications, In Proceedings of the 13th Annual International Conference on Mobile Systems, Applications, and Services, 2015, pp. 213-226.

Luo et al., ThiNet: A Filter Level Pruning Method for Deep Neural Network Compression, In Proceedings of the IEEE International Conference on Computer Vision, 2017, pp. 5058-5066.

Mathur et al., DeepEye: Resource Efficient Local Execution of Multiple Deep Vision Models Using Wearable Commodity Hardware, In Proceedings of the 15th Annual International Conference on Mobile Systems, Applications, and Services, 2017, pp. 68-81.

Mittal et al., Recovering from Random Pruning: On the Plasticity of Deep Convolutional Neural Networks, In 2018 IEEE Winter Conference on Applications of Computer Vision (WACV), pp. 848-857.

Molchanov et al., Pruning Convolutional Neural Networks for Resource Efficient Inference, arXiv:1611.06440v2, 2017, 17 pages.

Naderiparizi et al., Glimpse: A Programmable Early-Discard Camera Architecture for Continuous Mobile Vision, In Proceedings of the 15th Annual International Conference on Mobile Systems, Applications, and Services, 2017, pp. 292-305.

Oquab et al., Learning and Transferring Mid-Level Image Representations Using Convolutional Neural Networks, In Proceedings of the IEEE Conference on Computer Vision and Pattern Recognition, 2014, pp. 1717-1724.

Puri, A Survey of Unmanned Aerial Vehicles (UAV) for Traffic Surveillance, Department of Computer Science and Engineering, University of South Florida, 2005, pp. 1-29.

Russakovsky et al., ImageNet Large Scale Visual Recognition Challenge, International Journal of Computer Vision, 2015, 115(3):211-252.

Simonyan et al., Very Deep Convolutional Networks for Large-Scale Image Recognition, arXiv:1409.1556v6, 2015, 14 pages.

Stallkamp et al., Man vs. Computer: Benchmarking Machine Learning Algorithms for Traffic Sign Recognition, Neural Networks, 2012, 32:323-332.

Taigman et al., DeepFace: Closing the Gap to Human-Level Performance in Face Verification, In Proceedings of the IEEE Conference on Computer Vision and Pattern Recognition, 2014, pp. 1701-1708.

Zeng et al., MobileDeepPill: A Small-Footprint Mobile Deep Learning System for Recognizing Unconstrained Pill Images, In Proceedings of the 15th Annual International Conference on Mobile Systems, Applications, and Services, 2017, pp. 56-67.

Zhang et al., Live Video Analytics at Scale with Approximation and Delay-Tolerance, 2017, 28 pages.

Zhou et al., Places: A 10 Million Image Database for Scene Recognition, IEEE Transactions on Pattern Analysis and Machine Intelligence, 2018, 40(6): 1452-1464.

Zhou et al., Learning Deep Features for Scene Recognition Using Places Database, In Advances in Neural Information Processing Systems, 2014, pp. 487-495.

PCT International Search Report and Written Opinion, PCT/US2019/46011, Dec. 13, 2019, 14 pages.

(56) References Cited

OTHER PUBLICATIONS

Apple, Inc., Computer Vision Machine Learning Team, An On-Device Deep Neural Network for Face Detection, https://machinelearning.apple.com/research/face-detection, Nov. 2017, 4 pages.
AWS DeepLens, https://aws.amazon.com/deeplens/, 2019, 3 pages.
Beckett, This Powerful Wearable is a life-Changer for the Blind, Oct. 27, 2016, https://blogs.nvidia.com/blog/2016/10/27/wearable-device-for-blind-visually-impaired/, 3 pages.
Google Clips, https://web.archive.org/web/20180301070521/https://store.google.com/us/products/google_clips, 2018, 8 pages.
Monsoon Solutions Inc., Power Monitor, https://web.archive.org/web/20160427181243/https://www.msoon.com/LabEquipment/PowerMonitor/, 2016, 1 page.

* cited by examiner

Benchmark Profile

SYSTEMS AND METHODS FOR PROVIDING FLEXIBLE, MULTI-CAPACITY MODELS FOR USE OF DEEP NEURAL NETWORKS IN MOBILE DEVICES

CROSS-REFERENCE TO RELATED APPLICATIONS

This application is a national stage filing under 35 U.S.C. § 371 of International Application No. PCT/US2019/046011, filed Aug. 9, 2019, which claims priority to and the benefit of U.S. Provisional Patent Application No. 62/716,812, filed Aug. 9, 2018, the entire content of each of which is incorporated herein by reference.

STATEMENT REGARDING FEDERALLY SPONSORED RESEARCH

This invention was made with government support under 1617627, 1565604, and 1632051 awarded by the National Science Foundation. The government has certain rights in the invention.

BACKGROUND

There numerous types of systems in which it is desirable for a local, mobile device to be able to perform machine learning-based tasks using deep learning neural network models. Deep neural networks in mobile devices could be used for mobile vision, speech or audio recognition, or other similar examples where a processing unit is applying machine learning techniques to a real time input. In the past few years, deep learning has become recognized as a useful approach, due to its capability to achieve impressively high accuracies on a variety of tasks, including vision tasks, sound processing tasks, and other tasks involving the processing of sensor inputs from real world settings. For example, mobile vision systems with onboard cameras could be used in devices such as smartphones, tablets, autonomous vehicles, drones and other automated robotic systems, and augmented reality devices to revolutionize the way we live, work, and interact with the world. By processing live, real time, or streaming video inputs, these mobile systems are able to retrieve visual information from the world and could open up a wide range of new applications and services. For example, a drone that could detect vehicles, identify road signs, and track traffic flows could enable mobile traffic surveillance with aerial views that traditional traffic surveillance cameras positioned at fixed locations cannot provide. A wearable camera that could recognize everyday objects, detect people, and understand the surrounding environment could provide a great benefit for individuals with visual impairments.

Examples include the use of deep learning for object recognition, face detection, voice recognition, speech recognition, fingerprint scanning, music identification, and scene understanding. Being able to efficiently operate a deep learning neural network on a device, as opposed to outsourcing the neural network to a remote resource, could allow devices such as those noted above to realize even greater benefits to users and greater reliability. Compared to offloading vision tasks to the cloud, on-device deep learning has a number of advantages that are particularly attractive to mobile systems (as discussed herein below). First, it is independent of internet connectivity and avoids unpredictable networking latency, and thus is able to provide real-time user experiences. In the example of an autonomous vehicle, it would be undesirable for a car to have to pull over or otherwise cease autonomous operation simply because network traffic is high and network speed cannot keep up with processing the data streaming from the vehicle's cameras and other sensors. Instead, it would be much more preferable for the vehicle to be able to locally run the neural network and eliminate risks and complications from relying on a network connection. Second, onboarding the use of neural networks on mobile devices better preserves user privacy by processing privacy-sensitive data only locally on mobile systems.

However, there are several hurdles to enabling on-device deep learning. Two problems are that mobile devices have constrained and finite memory and computational resources, while operating deep neural networks requires an intense amount of memory and processing capability. Although modern mobile systems can be equipped with GB-level memory and powerful CPU/GPU, they still are not sufficient to reliably cope with the demands of on-device deep learning, given the memory and computational intensity of deep learning models. And, even if a mobile device were to be provided with abnormally high processing power, the device would then suffer from other drawbacks that could prevent user adoption or even be technologically unworkable, such as increased power consumption, excessive size and weight, overheating, and prohibitive cost.

One potential technique that could be used to address this challenge would be reducing resource demand by trading off a modest amount of accuracy. In other words, the neural network itself could be modified and reduced in order to cause it to use up less memory and less processing power of a mobile device. However, this technique falls short of being optimal for many kinds of applications, because once a deep learning model trades off accuracy to reduce its resource use, it cannot regain its sacrificed accuracy back even if extra resources become available. It would be undesirable to simply always have a less accurate deep learning model. For example, deciding to reduce a neural network so that it can accurately identify words in speech only at a rate of 90% would not be acceptable to many users (getting 1 out of every 10 words wrong would be an undesirable limitation to have to accept permanently for all scenarios). Similarly, accuracy is not a feature that designers of autonomous vehicle and drone guidance systems, or other visual sensor input functions, can trade off. To address this resulting problem, one naive approach might be to install both the full deep learning model as well as a smaller deep learning model (or other model variants with various resource-accuracy tradeoffs) on mobile systems. However, since these model variants are independent of each other, this approach is not scalable and becomes impractical when mobile systems need to run multiple deep learning models, with each of which having multiple model variants.

Another hurdle to overcome in a mobile device setting is that the device may need to be operating multiple different deep learning models at once, based on unpredictable real world circumstances. For example in a drone for use in a large manufacturing facility, the processor may need to operate a general deep learning model for recognizing yellow lines on a floor for purposes of guidance. But, if a person walks by the drone, it may suddenly need to use a facial recognition deep learning model to determine who the employee is. The use of the second deep learning model will take a large amount of resources, but cannot interfere with the general guidance model. As another example, an augmented reality system may need to run multiple vision tasks concurrently, to recognize people, landmarks, businesses, speech, music, sounds, and other external events. Applications like these would require a mobile vision systems to concurrently run multiple deep neural network models that target different vision and or auditory tasks. Likewise, the context in mobile setting can be changed very frequently. This requires mobile vision systems to be able to shift vision applications to execute new vision and other tasks to react to what is encountered in the new context.

Accordingly, it would be desirable to have a method for creating deep learning models that can be effectively and reliably used through standard available local resources of a mobile device that does not unnecessarily or permanent sacrifice accuracy, and which can respond to the demands of other models that may be running at the same time in response to unpredictable real world circumstances. And, correspondingly, it would be desirable to have mobile devices that can adequately operate deep learning models for a variety of tasks, using only onboard resources.

SUMMARY OF THE INVENTION

The present disclosure provides an improved method of implementing deep learning neural networks in mobile devices and/or other resource-constrained applications and systems.

In one aspect, the present disclosure provides a method for generating a multi-capacity neural network including obtaining a baseline deep learning model, creating at least one reduced deep learning model from the baseline model, recording a difference between the reduced deep learning model and the baseline deep learning model, generating a multi-capacity model including the reduced deep learning model and at least one other deep learning model using the recorded difference, wherein the reduced deep learning model shares its content in a nested arrangement with the at least one other deep learning model, and storing the multi-capacity model in a memory such that the reduced deep learning model and the at least one other deep learning model are selectively accessible by a processor.

In another aspect, the present disclosure provides a persistent memory storage, having stored thereon a set of instructions that, when executed by a processor, cause the processor to initiate a resource-aware runtime scheduler that encodes an inference accuracy and processing latency of each of a number of descendent models of a number of concurrently running applications into a cost function, provide the scheduler with dynamic information concerning runtime resources, and based on an output of the scheduler in response to the dynamic information, select a resource-accuracy trade-off scheme for a set of concurrently running deep learning models of the concurrently running applications, and determine the optimal amount of runtime resources to allocate to each model to jointly maximize the overall inference accuracy and minimize the overall processing latency of all the concurrently running applications.

In yet another aspect, the present disclosure provides a device including a local memory of the device having at least one multi-capacity neural network stored thereon, at least one local processor operatively coupled to the memory, at least one input operatively connected to the processor, wherein the memory has stored thereon a set of instructions which, when executed by the processor, cause the processor to run a resource-aware scheduler, and via the resource-aware scheduler, load from memory and execute a descendant of the multi-capacity neural network.

In an additional aspect, the present disclosure provides a software development system including at least one server processor of a network in communication with a user computer, at least one memory in communication with the at least one server processor, having stored thereon a set of instructions which, when executed by the server processor, cause the server processor to receive a request from the user computer, in response to the request from the user computer, obtain a deep learning model, transform the deep learning model into a multi-capacity deep learning model, wherein the multi-capacity model has an architecture allowing for adaptive model compression and recovery during runtime, and send the multi-capacity deep learning model to the user computer.

DETAILED DESCRIPTION OF THE INVENTION

Figure 1:
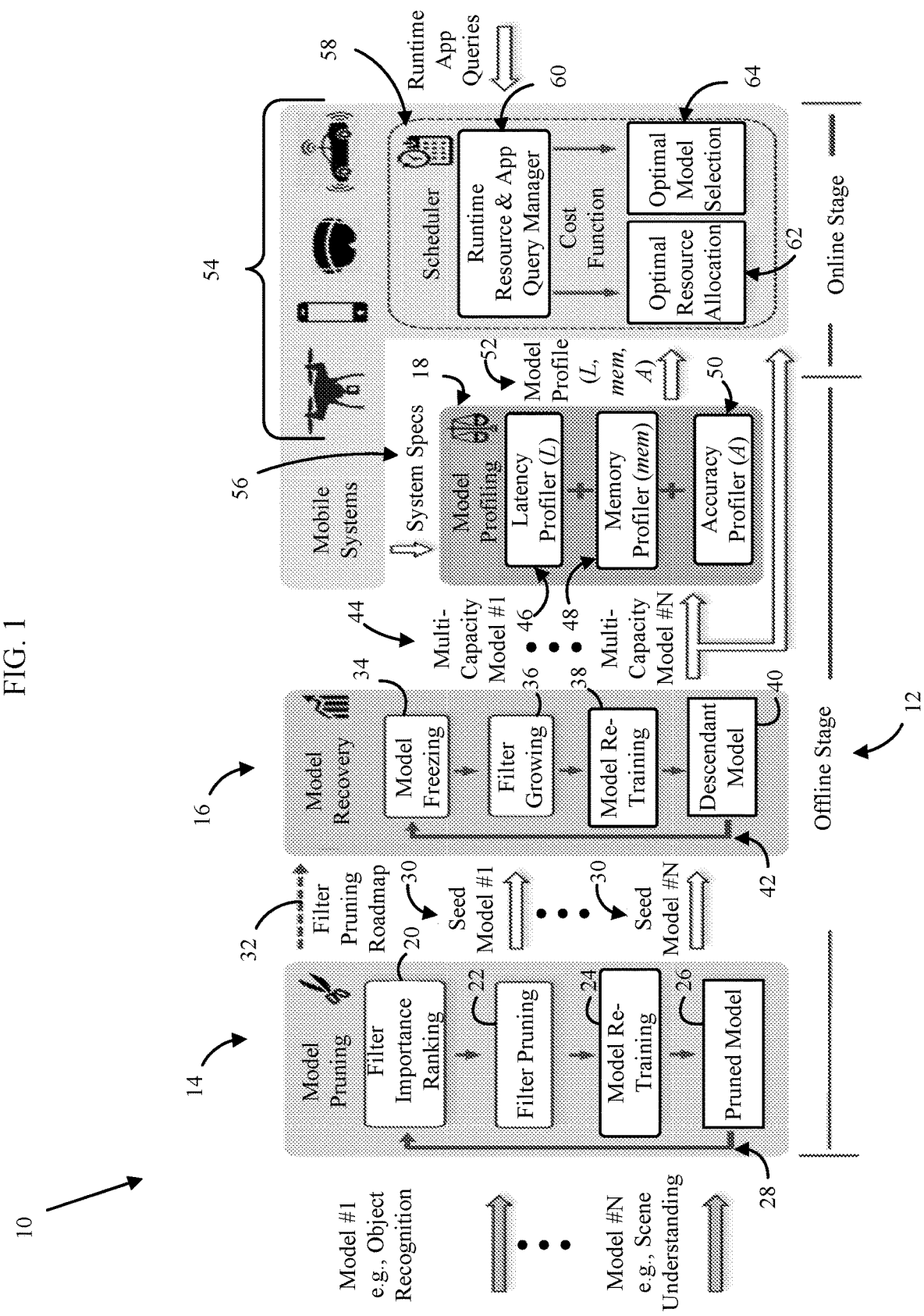
FIG. 1 is a flowchart and functional block diagram illustrating an overview of certain types of methods of implementing multi-capacity models in accordance with this disclosure.

The present disclosure describes various methods and embodiments for implementing deep learning neural networks in mobile devices (or other resource-constrained applications and systems) reliably and effectively, while preserving accuracy and adequately coping with unpredictable real world circumstances. One overall approach for establishing such neural networks is to utilize a framework that takes the dynamics of runtime resources into consideration to enable resource-aware multi-tenant on-device deep learning. Compared to fixed deep learning models (where a predetermined or set resource/accuracy trade-off remains static), such a framework can provide flexible resource-accuracy trade-offs, and dynamically select the optimal resource-accuracy tradeoff for each deep learning model at runtime to fit the model's resource demand to the system's available runtime resources. In doing so, embodiments disclosed herein are able to efficiently utilize the limited resources in a mobile system to maximize the performance of multiple concurrently running applications.

One aspect of such a framework involves employing a novel model pruning and recovery scheme which transforms a deep learning model into a single, compact, multi-capacity model. The multi-capacity model may comprise a set of nested or descendent models, each of which offers a unique resource-accuracy trade-off. Unlike traditional deep learning models that are static and independent of each other, a nested or descendent model with smaller capacity (i.e., resource demand) shares its model parameters with a descendent model with larger capacity, making itself nested inside the descendent model with larger capacity without taking extra memory space. In doing so, the multi-capacity model is able to provide various resource-accuracy trade-offs with a compact memory footprint. A multi-capacity model in accordance with various features of this disclosure can allow for two possibilities not previously obtained in the use of deep learning models. First, the multi-capacity model is comprised of a set of sub-models. Each sub-model has a unique capacity to provide an optimized resource-accuracy tradeoff. Second, unlike traditional model variants that are independent of each other, the sub-model with smaller capacity shares its model architecture and its model parameters with the sub-model with larger capacity, making itself nested inside the sub-model with larger capacity without taking extra memory space. By doing so, the multi-capacity model is able to provide various resource-accuracy tradeoffs with a compact memory footprint.

A second aspect of such a framework is that, when the multi-capacity models are used in actual operation, they allow for an adaptable approach to selecting the right tradeoff between resource consumption and performance. However, allowing for flexibility in determining an appropriate resource-accuracy tradeoff for each of several concurrently-running deep learning models involves taking into account several factors and preferences for each deep learning model. Different models have different goals on inference accuracies and processing latencies. Taking a traffic surveillance drone as an example: an application that counts vehicles to detect traffic jams does not need high accuracy but requires low latency; processing data with even a is latency might not be adequate, as the results may already be outdated by the time the processing has completed, as traffic might be moving fairly quickly. In contrast, an application that reads license plates needs high plate reading accuracy but does not require real-time response—such an application would not be especially detrimental if the results were returned is or more after image data were acquired, but would not tolerate inaccuracy in the inferred license plate number results from the image processing. In other words, the creation of multi-capacity model enables a device to jointly maximize the performance of concurrent vision applications. This comes from two new possibilities that can be obtained through use of novel multi-capacity models. First, while a certain amount of runtime resources can be traded for an accuracy gain in some neural network applications, the same amount of runtime resources might be able to be traded for a much larger accuracy gain in some other neural network application on the device. Second, some neural network applications may not warrant or require devoting such a high amount of processing resources as to provide a real-time response and thus can tolerate a relatively large inference latency (e.g., scene understanding or reading a license plate number). This presents an opportunity to reallocate some runtime resources from the latency-tolerant application to applications that need more runtime resources to meet the real-time requirement (e.g., road sign identification). A system using multi-capacity models can exploit these new possibilities by incorporating the accuracy and inference latency into a cost function for each vision application. Given the cost functions of all the concurrently running vision applications, a device can employ a runtime scheduler that selects the most suitable sub-model of a multi-capacity model for each application and determines the optimal amount of runtime resources to allocate to each selected sub-model to jointly maximize the accuracy and minimize the inference latency of concurrent vision applications.

Implementing flexible, multi-capacity models can be thought of in some circumstances as involving two stages. The creation of these multi-capacity models for given deep learning tasks or applications can be thought of as an initial or "offline" stage of the framework. In other words, there is a unique approach to creating these models that takes into account where, and under what conditions, they will be used. Their use in a real-time setting can then be thought of as the "online" stage, during which a decision is made as to which of the nested or descendant models is the appropriate one to use given conditions existing at that moment. These decisions are made on the mobile device itself, given various preferences or metadata concerning the tolerances of various tasks for latency in processing time, delay in scheduling, and accuracy.

Example System Overview

FIG. 1 shows a functional block diagram 10 that reflects a general method for creating multi-capacity models for deep learning tasks (i.e., one example of the "offline" stage of the present disclosure), along with the interaction of this method with the ultimate device in which the model will be used and its particular task. The depicted method is an example for use with a convolutional neural network (CNN) type of architecture. However, based on the discussion of this method and the content of this disclosure, it will be understood that the concepts shown here for CNN architectures could also be used for other types of neural networks, such as a recurrent neural network (e.g., LSTM), other types of feedforward neural networks besides CNNs (e.g., probabilistic, autoencoder, and time delay), RBF, GRNN, and modular.

Experimental results show that the multi-capacity model is able to provide optimized resource-accuracy tradeoffs, and significantly reduce model memory footprint as well as model switching overhead.

The "offline" stage 12 of the diagram 10 of FIG. 1 implements an overall pruning and recovery scheme to transform a deep learning model (such as a known or "off-the-shelf" deep learning model, like AlexNet or ResNet) into a single compact multi-capacity model that is able to provide optimized resource-accuracy trade-offs. (While reference may be made herein to "off-the-shelf" or "standard" deep learning models, it should be noted that the disclosed methods and techniques will be applicable for any deep learning model.) The offline stage 12 includes three general phases: model pruning 14, model recovery 16, and model profiling 18.

In the model pruning phase 14, a novel filter pruning approach (herein referred to as Triplet Response Residual (TRR)) can be used that can significantly reduce not only the size of a deep learning model (e.g., the amount of memory it occupies in order to be stored locally) but also its computational cost (e.g., the amount of processing resources required to run the model for a given input). First, a filter importance ranking step 20 takes place in which the importance of the filters of a deep learning model (as judged by, e.g., their contribution to providing an accurate output) are identified, so that the filters can be ranked. This step 20 can be performed using the novel TRR approach discussed in more detail below, but it should be noted that several different variations of this approach can be used, as well as alternative approaches, as discussed below, so long as less important filters are identified through the process. By following the filter importance ranking provided by the TRR approach, less important filters in a given trained off-the-shelf deep learning model can be pruned in a following step 22. The number of filters that are pruned 22 from the model after a filter importance ranking 20 can vary from none to many, depending on the distribution of importance across filters (e.g., if several filters are found to be very unimportant), the number of flexible models desired for the multi-capacity model to be created, and user preference. The model is then retrained at a following step 24 without use of the pruned filters, to result in a trained, pruned model 26 that is smaller than the original model and smaller than the descendant model for which the current iteration was taking place (if not the original model). Steps 20, 22, and 24 can be repeated 28 for multiple iterations for the same deep learning model, until an end point is reached. The end point may be a set number of iterations (e.g., if a given application only needs a few flexible options for size of a deep learning model, or if a device or operating system cannot cope with, or would not benefit from, more flexible options), or may be dynamic (e.g., iterations occur until the model size reaches some minimum, or the model could no longer achieve a minimum desired accuracy if further pruned, or if the minimum latency would be already assured). Notably, in this particular approach, rather than simply pruning filters and using the pruned model as a potential option for smaller deep learning model, during each iteration 28, as less important filters are pruned, the pruned model 26 is retrained to compensate for the accuracy degradation (if there is any) caused by filter pruning.

When the iterations 28 end, the resulting smallest pruned model is called the seed model 30. At each iteration 28 leading up to the final one, a record or log is made of which filters were pruned. As a result, a filter pruning roadmap 32 is created where each "footprint" on the roadmap represents or identifies a pruned model with its filter pruning record. This filter pruning roadmap 32 and the seed model 30 are then passed to the model recovery phase 16.

In the model recovery phase 16, the filter pruning roadmap 32 is followed as part of a novel model freezing and filter growing ("freeze-&-grow") approach to generate a multi-capacity version of the off-the-shelf deep learning model. The model recovery phase 16 uses the seed model 30 as its starting point, and begins by freezing 34 the architecture and parameters of the model (which would be the seed model 30 for the first iteration, or the then-current descendant model 40 that resulted from the previous iteration of the model recovery phase 16). Following the filter pruning roadmap 32 in the reverse order and adding the pruned filters back, the model recovery phase 16 then implements a step of filter growing or expansion 36. Accuracy is then regained for the expanded model by retraining the model 38. By repeating the iteration 42 of these steps, a new descendant model 40 is grown upon the previous descendant model. As a result, the final descendant model has the capacities of all the previous descendant models. Thus, it can be thought of as a multi-capacity model 44, since it has the capacity to operate in a variety of accuracy/resource tradeoff forms. In other words, at runtime, a mobile device using the multi-capacity model 44 will have the ability to operate the model in the form of any of the iteratively developed descendant models 40 depending on available resources and task requirements.

The model profiling phase 18 is an optional step in which a profile may be generated for a given multi-capacity model. The profile can be thought of as a set of characteristics or metadata that can be used to inform the run-time choice of which descendant model 40 of the multi-capacity model 44 offers the most appropriate balance of resource consumption and performance (e.g., accuracy and latency). The processing latency 46, memory footprint 48, and accuracy 50 characteristics of each descendant model 40 of the multi-capacity model 44 are identified and stored in an overall model profile 52 of the multi-capacity model 44. Additionally, the model profiling phase 18 may also take into account attributes, limitations, and requirements of the specific type of mobile device 54 in which the multi-capacity model 44 will be used as well as the particular task for which the model will be used within the device 54. The particular limitations or requirements of the mobile device 54 that could be taken into account include power consumption, processing resources available (e.g., are co-processors used?), how many different neural networks are likely to be operating at the same time given the type of device and its functions, and the likelihood of predictable versus unpredictable timing of when the various neural networks may need to run (e.g., given the environment in which the device operates). The needs and tolerances of the given task within the mobile device for which the multi-capacity model may be used can also be taken into account. For example, if a given deep learning model will be used to identify a person from an incoming video stream of a mobile phone or other personal device, that task can potentially tolerate some amount of latency but would not lend itself to inaccuracy. In contrast, if the same deep learning model were to be used in a person's autonomous vehicle to identify individuals walking along a sidewalk, latency would become more of an issue since the results would not be useful if the vehicle had already traveled far beyond the individual by the time the results were returned. Instead, for a non-critical function like predicting the identity of passersby, results returned from a deep learning model that lack a high degree of confidence or otherwise demonstrate the potential for inaccuracy could simply not be presented to the user. Likewise, if a given deep learning model will be used to identify words in an incoming audio stream, a particular optimum balance of latency and accuracy might be known for such application based on user preferences or manufacturer's experience.

As an independent step, a scheduler 58 may also be developed. This scheduler does not need to be created for each multi-capacity model 44, but rather would be an existing component of, or modification to, the operating system of a mobile device 54 in which the multi-capacity model 44 would be used. The design of, and alternative options for, the scheduler 58 will be described in more detail below, but as a general overview: the scheduler 58 continuously monitors events including changes in available runtime resources and requests to start new applications 60, which can encompass whether existing applications close or conclude. The scheduler 58 can also monitor various environmental factors from sensor input, and/or the output of various deep learning models, to assess whether circumstances are present that would elevate or change the criticality, priority, or importance of various applications. In operation, the scheduler 58 examines the model profiles 52 of all running tasks that use multi-capacity models, selects the appropriate descendant model for each application 62, and determines the amount of runtime resources to allocate to each selected descendant model 64 to jointly maximize the accuracy and minimize the inference latency of those applications. In other words, the scheduler 58 is resource-aware in that it assesses current available resources and the importance of speed versus accuracy for each multi-capacity model's task. As such, runtime resources are best utilized to maximize the performance of all the vision applications concurrently running on a mobile vision system.

Accordingly, a run-time scheduler 58 is disclosed that can utilize the flexibility of multi-capacity deep learning models 44 to allocate available computational resources of a resource constrained system 54 (like a mobile device) so as optimize accuracy and latency of concurrently-running neural network-based applications. The available runtime resources in mobile systems 54 are dynamic and can quickly change as a result of unpredictable real world events that result in internal changes such as starting new applications, closing existing applications, and application priority shifts. The scheduler 58 is able to select the most appropriate accuracy-resource tradeoff for each of the concurrent applications and determine the amount of runtime resources to allocate to each application to optimize the scheduling objective. Experimental results show that a runtime scheduler designed per the teachings of this disclosure outperforms non-resource-aware systems, achieving as much as 4.2% increase on accuracy, 2.0× increase on frame rate (for vision applications) and 1.7× reduction on energy consumption when running concurrent mobile applications.

Detailed System Design Examples

In this section, a detailed example is provided for how to develop a system that implements multi-capacity deep learning models and associated runtime scheduling for one type of neural network—a convolutional neural network. In general, most CNN architectures include four types of layers: convolution layers, activation layers, pooling layers, and fully-connected layers. The convolution layers are the most computational intensive layers among the four types of layers. Each convolution layer is composed of a set of 3D filters, which play the role of "feature extractors". By convolving an image or other input data with these filters, a set of features an be generated that can be thought of as being organized in the form of feature maps, which are further sent to the following convolution layers for further feature extraction. Because of the high computational intensity required by the convolutional layers of a CNN, the convolutional layers will be used as examples below for illustration how and why a multi-capacity deep learning model framework in accordance with various embodiments operates to provide beneficial reductions in processing needs along with higher performance. However, it is to be understood that these concepts described below can equally apply to other layers of CNNs as well as other types of neural networks, and that various alternatives and optional features can be used.

Below, each of the phases of the "offline" stage, as well as the details of the "online" stage of one implementation of a multi-capacity deep learning model system are discussed in detail.

Figure 2:
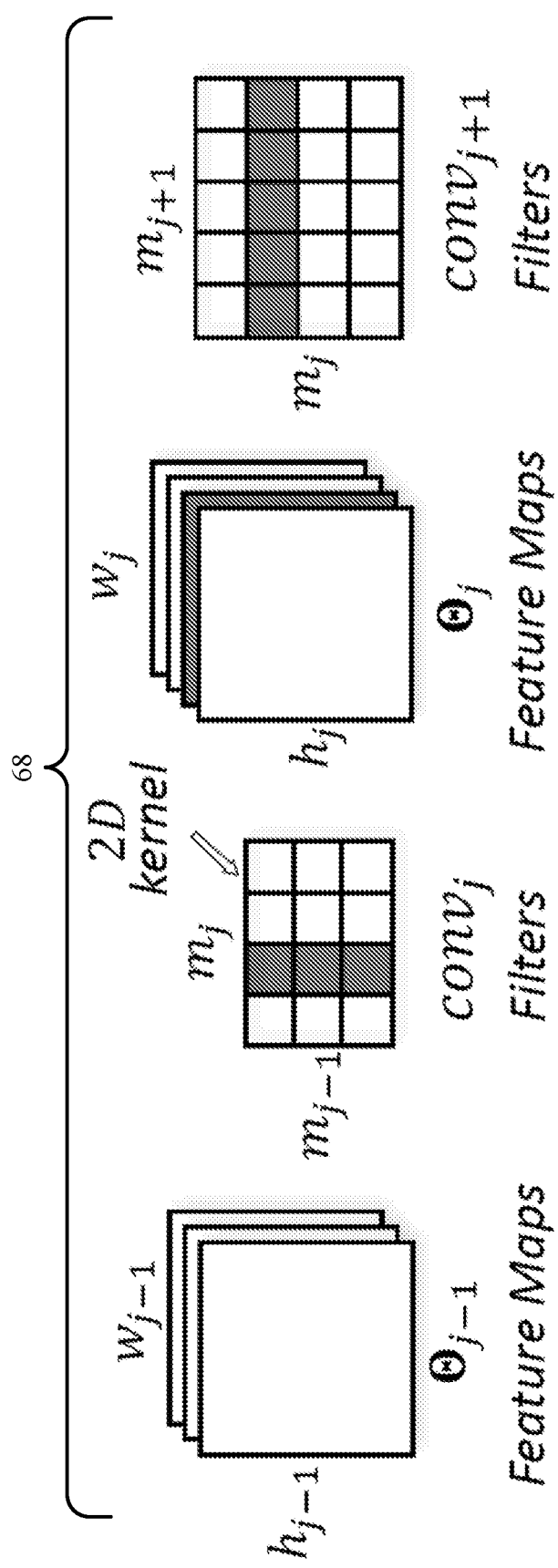
FIG. 2 is a graphical representation of a model pruning method.

Filter based Model Pruning. FIG. 2 provides a visual representation 68 of one example of what happens during a filter pruning phase for a CNN. In the annotations of the FIG. 2, let $\Theta_{j-1} \in \mathbb{R}^{w_{j-1} \times h_{j-1} \times m_{j-1}}$ denote the input feature maps of the jth convolutional layer $conv_j$ of a CNN, where $w_{j-1}$ and $h_{j-1}$ are the width and height of each of the input feature maps; and $m_{j-1}$ is the total number of the input feature maps. The convolutional layer $conv_j$ consists of $m_j$ 3D filters with size $k \times k \times m_{j-1}$ ($k \times k$ is the 2D kernel). It applies these filters onto the input feature maps $\Theta_{j-1}$ to generate the output feature maps $\Theta_j \in \mathbb{R}^{w_j \times h_j \times m_j}$ where one 3D filter generates one output feature map. This process involves a total of $m_j k^2 m_{j-1} w_j h_j$ floating point operations (i.e., FLOP).

Since one 3D filter generates one output feature map, pruning one 3D filter in $conv_j$ (the shaded column represented in $conv_j$) results in removing one output feature map in $\Theta_j$ (the shaded map represented in $\Theta j$), which leads to $k^2 m_{j-1}$ parameter and $k_2 m_{j-1} w_j h_j$ FLOP reduction. Subsequently, $m_{j+1}$ 2D kernels applied onto that removed output feature map in the convolutional layer $conv_{j+1}$ (the shaded row represented in $conv_{j+1}$) are also re-moved. This leads to an additional $k_2 m_{j+1}$ parameter and $k 2 m_{j+1} w_{j+1} h_{j+1}$ FLOP reduction. Therefore, by pruning filters, both model size (i.e., parameters) and computational cost (i.e., FLOP) are reduced.

Other similar tasks can be performed for neural network types beyond CNNs, to reduce the size or parameterization of the network. For example, such methods may include pruning weights during the initial training of a recurrent neural network, grouping connection weights into fewer parameters in feedforward neural networks (such as by parameter hashing).

Filter Importance Ranking based on Triplet Response Residual. When pruning filters of a neural network for purposes of creating a multi-capacity model, it is desirable to prune the least important filter or filters during each iteration of creating a descendant model. By pruning those filters that have the least impact on accuracy of the model during each successive iteration, the size and computational cost of a CNN model can be more effectively reduced in a way that allows for subsequent flexibility.

A new novel filter importance ranking approach is herein disclosed, that may be used to effectively measure the importance of filters and rank them based on their relative importance; this novel approach is named Triplet Response Residual (TRR). The TRR approach is guided by the recognition that, since a filter plays the role of a "feature extractor", a filter is important toward accuracy of a given descendant model if it is able to extract feature maps that are useful to differentiate input data sets belonging to different classes. In other words, a filter is important if the feature maps it extracts from input datasets reflecting one real world condition sensed by a mobile device (e.g., an image of a person) are more similar than the feature maps extracted from input datasets reflecting a different real world condition (e.g., an image of an empty road).

To demonstrate how this can be done in one embodiment, let {anc, pos, neg} denote a triplet that consists of an anchor input dataset (anc) such as an anchor image, a positive input dataset (pos) such as a positive image, and a negative input dataset (neg) such as a negative image where the anchor dataset and the positive dataset are from the same class (e.g., reflect the same sensed condition), while the negative image is from a different class (e.g., reflects a different sensed condition). The TRR of a particular filter i can then be defined as $$TRR_i = \sum \left( \|\mathcal{F}_i(anc) - \mathcal{F}_i(neg)\|_2^2 - \|\mathcal{F}_i(anc) - \mathcal{F}_i(pos)\|_2^2 \right) \quad (1)$$

where i denotes the filter index and F(•) denotes the generated feature map. In a broad sense, the TRR score calculates the L2 distances of feature maps between (anc, neg) and between (anc, pos), and measures the residual between the two distances. By summing up the residuals of all the triplets from the input datasets, the TRR value of a particular filter reflects its capability of differentiating images belonging to different classes, acting as a measure of importance of the filter within the deep learning model.

Using this TRR value, a ranking of the importance of the filters of a deep learning model can be made, allowing the least important filters to be pruned from successive descendant models. It should be understood, however, that other methods of identifying filters, weights, or other parameters if a neural network could also be used in alternative embodiments, to create such rankings.

Figure 3:
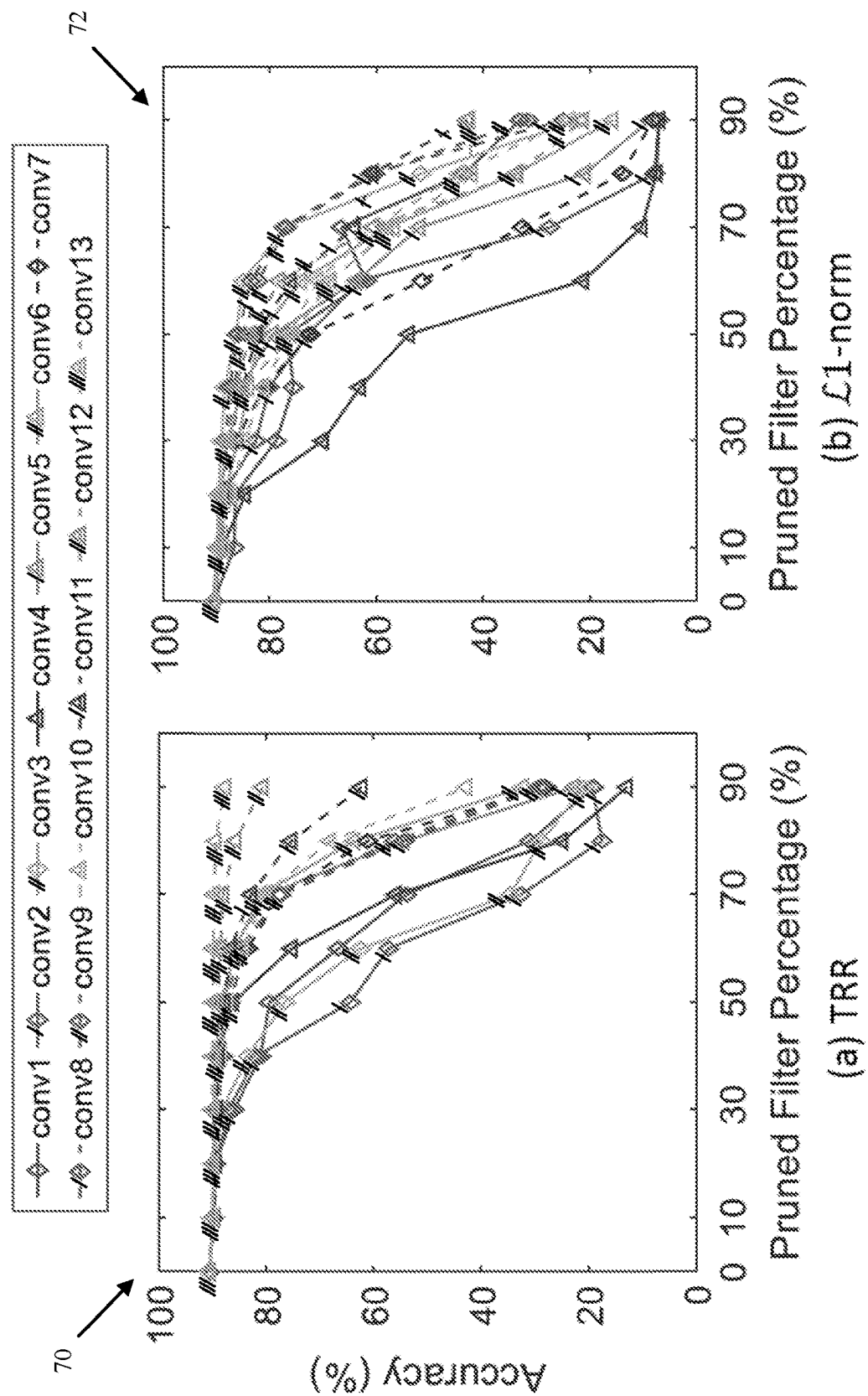
FIG. 3(a) is a graph that plots the accuracy percentage versus pruned filter percentage for a number of examples of convolutional layers of a convolutional neural network.
FIG. 3(b) is a graph that illustrates the filter importance profiling performance of L1-norm on the same model trained on the dataset that was used in FIG. 3(a).

Performance of Triplet Response Residual-based Filter Importance Ranking. FIG. 3(a) is a graph 70 that plots the accuracy percentage versus pruned filter percentage for a number of examples of convolutional layers of a CNN that was pruned based on the TRR method disclosed herein. In other words, FIG. 3(a) illustrates the filter importance profiling performance of the TRR method on a deep learning model, in this case using as an example a VGG-16 model that was trained on a training dataset known as CIFAR-10. (VGG-16 is a CNN that can be used for image classification, and CIFAR-10 is a collection of images that can be used to train neural networks for computer vision applications.) The VGG-16 model contains 13 convolutional layers. Each of the 13 curves in FIG. 3(a) depicts the test accuracies of the VGG-16 model when filters of a particular convolutional layer are pruned while the rest of the convolutional layers remain unmodified. Each marker on the curve corresponds to the test accuracy when a particular percentage of filters are pruned. As an example, the topmost curve (marked as blue dotted line with blue triangle markers and three hashmarks) shows the test accuracies are 89.75%, 89.72% and 87.40% when 0% (i.e., the full VGG-16 model with no filters pruned), 50% and 90% of the filters within the 13th convolutional layer $conv_{13}$ are pruned, respectively.

From this performance data, it can be observed that the TRR approach is able to effectively identify redundant filters within every convolutional layer. In particular, the accuracy of the CNN overall remains essentially the same when 59.96% of the filters in conv13 are pruned. This indicates that the TRR approach was able to identify truly redundant filters. By pruning these redundant filters, the VGG-16 model was effectively compressed without any meaningful accuracy degradation. Additionally, it can be seen that the TRR approach is able to effectively identify which convolutional layers are more sensitive to filter pruning. This is reflected by the differences in accuracy drops when the same percentage of filters are pruned at different convolutional layers. This sensitivity difference across convolutional layers can be taken into account in the iterative filter pruning process.

In experimental testing, the TRR approach was compared with another filter pruning approach that uses the L1-norm of a filter to measure its importance. FIG. 3(b) is a graph 72 that illustrates the filter importance profiling performance of L1-norm on the same VGG-16 model trained on the CIFAR-10 dataset that was used in FIG. 3(a). By comparing FIG. 3(a) to FIG. 3(b), it can be observed that, while both filter importance ranking methods allow for some amount of accuracy retention as greater percentages of filters are pruned, the TRR achieves better accuracy than the L1-norm method at almost every pruned filter percentage across all 13 curves. For example, pruning filters based on the TRR method achieves an accuracy of 89.72% and 87.40% when 50% and 90% of the filters at conv13 are pruned respectively, while pruning filters based on the L1-norm method only achieves a corresponding accuracy of 75.45% and 42.65%. This result indicates that the filters pruned by TRR have much less impact on accuracy than the ones pruned by L1-norm, demonstrating that TRR outperforms L1-norm at identifying less important filters.

Filter Pruning Roadmap. By following a filter importance ranking (e.g., a ranking provided by TRR), a pruning step can be undertaken to reduce the number of filters in a deep learning model. This can be done once (which would result in a multi-capacity model having two resource/accuracy tradeoffs—the full model and one descendant), or multiple times in an iterative process as described with respect to FIG. 1. During each iteration, less important filters across convolutional layers (or correlatively in non-CNN neural networks) are pruned, and the pruned model is retrained (using the same training dataset as originally used to develop the baseline model, or a reduced dataset) to compensate the accuracy degradation (if there is any) caused by filter pruning. The degree of pruning can vary—e.g., it can be a set percentage of filters determined by the user (e.g., in order to achieve a desired resource reduction), it can be a set percentage divided by the desired number of descendants, or can be assessed empirically. In other words, the iteration can end when the pruned model can no longer not meet the minimum accuracy requirement set by the user and/or determined by the needs of the task for which the deep learning model will be used. Over the course of pruning, the content of FIGS. 3(a) and 3(b) can be taken into account—meaning, early iterations of pruning could remove a higher number of filters (or otherwise cause size reductions, e.g., in the case of non CNN neural networks) compared to later iterations, so that accuracy drops from descendant to descendant are more uniform. Alternatively, the number of filters pruned per iteration could remain constant so that the reduction in required resources from descendant to descendant remains more uniform. And, these considerations can be adaptively taken into account to suit the particular needs and likely scenarios of a mobile device in which the multi-capacity models are to be used.

During the course of pruning, a filter pruning log or roadmap file can be created, where each record or footprint on the roadmap corresponds to an iteration or a pruned model and indicates what was done to the model to reduce its size compared to the next largest. The smallest pruned model on the roadmap is called the seed model. This filter pruning roadmap file will be used to guide the model recovery process described below.

Freeze-&-Grow based Model Recovery. The filter pruning process discussed above results in one or more pruned or compressed models, each acting as a model variant of the original neural network model (e.g., ResNet or VGG-16) with each having a unique tradeoff determined by its resource-accuracy profile. However, due to the retraining step within each pruning iteration, these pruned or compressed models may have different model parameters, or differently grouped weights, or other idiosyncrasies resulting from the model pruning/compression phase. Thus it may be the case that each pruned/compressed variant is independent from the others. Therefore, although these model variants provide different and flexible resource-accuracy tradeoffs, keeping all of them locally in a resource limited mobile system may not be practical or desirable for all cases.

To address this problem, some embodiments may involve the generation a single multi-capacity model that can act equivalently to (e.g., can provide the same benefits and outputs as) a set of pruned models. In other words, one multi-capacity model can provide different resource-accuracy tradeoffs just like a set of pruned, independent model variants, but has a model size that is much smaller than the accumulated model size of all the pruned model variants.

Figure 4:
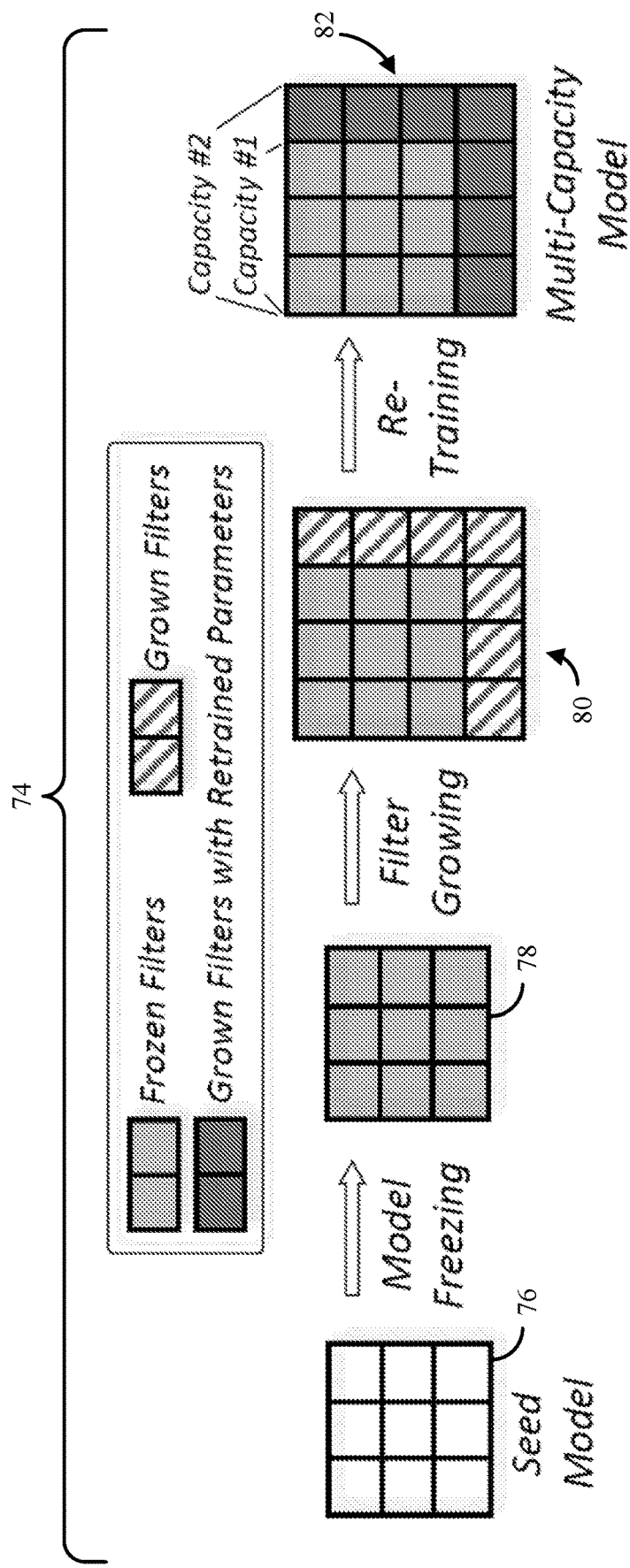
FIG. 4 is a graphical representation of a filter growing method.

This multi-capacity framework may be achieved by an innovative model freezing and filter growing approach. For example, in one embodiment, the generation of a multi-capacity model can begin with the seed model derived from a filter pruning/compression phase, and by then following the filter pruning roadmap and the freeze-&-grow approach, the multi-capacity model is iteratively created. FIG. 4 is a graphical depiction of the steps and results of an example freeze-&-grow method 74 for a first iteration. For illustration purposes, the deep learning model reflected in this method 74 is a CNN, and only one convolutional layer is depicted. Starting with the seed model 76 having a minimum size or dimensionality, a model freezing step 78 is first applied to "freeze" the parameters of all its filters (now reflected as blue squares). In other words, the parameters of the filters are all set to remain constant beginning at step 78, based on the seed model 76 (or, in subsequent iterations, the previous model from which the current model is to be grown). Next, since each footprint on the roadmap developed in the pruning/compression stage reflects the filters that were pruned in each iteration of the pruning process (or other compression method, such as grouping, hashing, eliminating gating or parameterization, or the like), the roadmap can be followed in the reverse order in a filter growing step 80 to iteratively add back in the previously "pruned" filters (marked as green stripe squares) to "grow" the current model. (Alternatively, in non-CNN architectures, or in cases where a compression method other than pruning was used, the weights or filters that were removed or combined would be added back independently). With the added filters, the capacity of this descendant model is increased. The "grown" descendant model can then be retrained at step 82 to regain accuracy. As is illustrated, since the seed model is frozen, its parameters need not be changed during retraining. Rather, in one embodiment only the parameters of the added or "regrown" filters are changed during retraining (marked as green squares to indicate that the parameters are changed). As a result, a single model 82 that not only has the capacity of the seed model (for illustration purposes, the initial 3×3 dimensionality) but also has the capacity of the descendant model (making model 82, for illustration purposes, a 4×4 dimensionality). Additionally, the initial seed model shares its model architecture and all its model parameters with the descendant model, making itself nested inside the descendant model without taking extra memory space.

The method 74 can then be repeated (e.g., when a multi-capacity model is desired that has more than two sizes), using the previously grown multi-capacity model 82 as the "seed" model 82 in the next iteration of the method 74. Thus, for subsequent iterations, a new descendant model is grown upon the previous descendant model whose parameters are frozen, resulting in a further capacity or size being added to the multi-capacity model. Each new descendant model can then be fed into the next iteration. As a result, the final descendant model can contain all of the previous descendant models up to and including the original deep learning model which was used in the first pruning step of the pruning phase. In such manner, the final descendant model has the capacities of all the previous descendant models.

Figure 5:
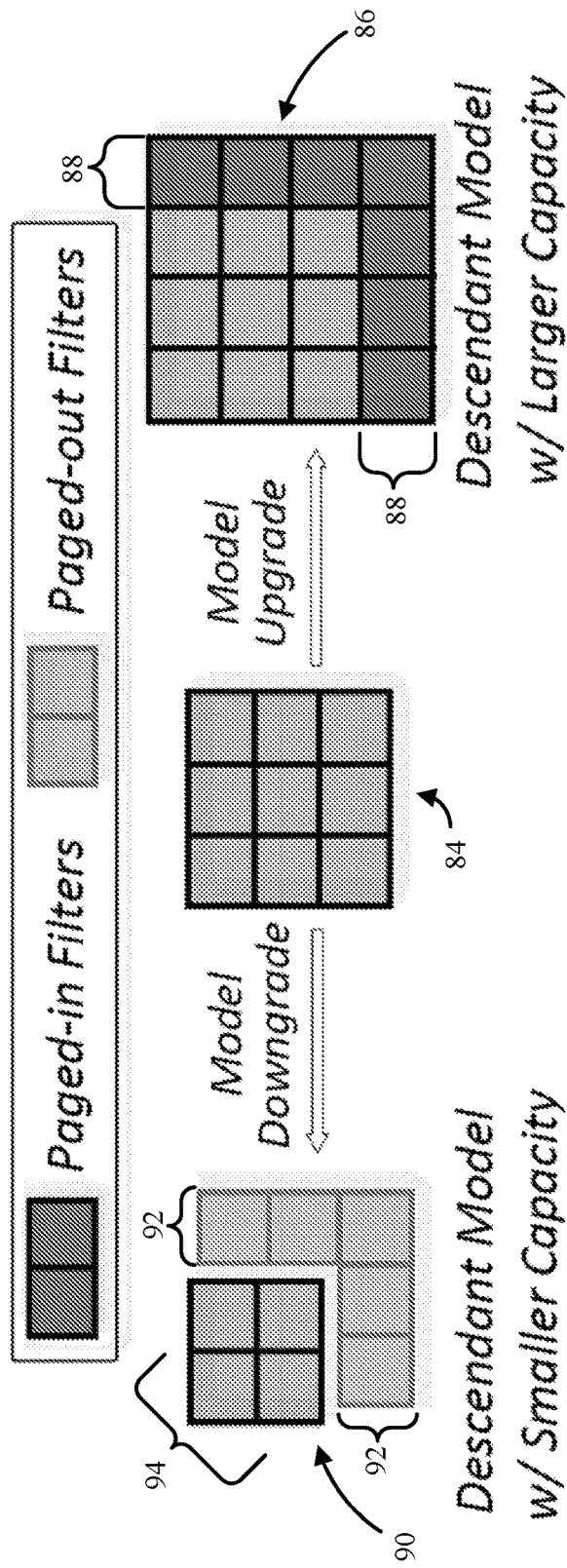
FIG. 5 is a graphical depiction of a page-in, page-out process.

FIG. 5 shows a graphical representation of one example of how a multi-capacity model would be used in operation to swap out sizes of descendant models according to the needs, limitations, and task preferences of a particular device. For illustration purposes, only one convolutional layer is depicted. When a particular task is called by a device, the device will select a particular capacity (as will be further described below) resulting in a given descendant model 84 being paged in from a memory operatively connected to the processor (or processors) of the device and executed based on given input data. Since each descendant model is built upon its previous descendant models, when the processor subsequently determines that a different descendant model is needed (e.g., based on increased available resources or other factors) the current descendant model 84 is effectively switched to a descendant model with larger capability 86 (e.g., a model upgrade). Rather than swapping out the entire current descendant model 84 and paging in an entire new descendant model 86, a device using the multi-capacity model framework disclosed herein incurs zero (or a substantially reduced) page-out overhead at runtime, and only needs to page in the extra filters 88 included in the descendant model with larger capability 86 (marked as green squares). Alternatively, in other embodiments, some paging out of the content of the current descendant model 84 may occur, depending on the type of compression involved, and replacement content plus additional content is paged in to reach the larger capability model 86.

Similarly, when it is desired to switch from a current descendant model 84 to a new descendant model with smaller capability (e.g., downsizing the capability and resource demands, due to existing factors at runtime), the processor of the device will incur zero (or substantially reduced) page-in overhead since some portion 94 of the current descendant model 84 will remain in active memory, and the processor only needs to page out to long term memory the filters 92 that the descendant model with smaller capability does not have or need (marked as gray squares). As a result, using a multi-capacity framework can significantly reduce the model page in and page out overhead, making model switching extremely efficient as compared to a scheme in which entire independent models of varying size might be used as resources allow.

Resource-Aware Scheduling (Online Phase). Using a multi-capacity deep learning model framework in accordance with the various embodiments and alternatives disclosed herein can also allow for maximizing the performance of multiple neural network-based applications that are concurrently running on mobile vision systems. This achievement can be thought of as based on two possibilities unlocked by using a multi-capacity model for more than one neural network based application.

First, it is now possible to decide at runtime how much processing power to devote to each of the multi-capacity neural networks. Thus, while a certain amount of additional runtime resources can be devoted to using a higher-level descendant model, resulting in an accuracy gain in one deep neural network task, the same amount of "extra" runtime resources might also be able to be devoted to the multi-capacity neural network performing a different task for a much larger accuracy gain (or more critical accuracy gain, in the context of the particular mobile device). For example, in an autonomous vehicle setting, a given amount of available processing power might be used for an accuracy gain in a neural network running on the input of an optical sensor to help guide the vehicle. However at night when there might be diminished data from an optical sensor, it might be more critical to devote the available processing power to the input of a radar or lidar sensor. As another example, given the particular size versus accuracy curve for one multi-capacity model (see, e.g., FIG. 3(a)) compared to that of a second multi-capacity model, it may be that devoting some or all of the available resources to the second multi-capacity model will result in a far greater accuracy increase than if all or most of the available resources were devoted to the first multi-capacity model.

Second, it is also now possible with multi-capacity models to let the importance of accuracy and latency for a given task inform how much resources should be devoted to the neural network associated with that task. For example, some vision applications do not require real-time responsiveness and thus can tolerate a relatively large inference latency (e.g., a vision application for scene understanding in a given type of mobile device might have an inference latency of even a few seconds). This presents an opportunity to reallocate some runtime resources from the latency-tolerant vision application to vision applications that need more run-time resources to meet the real-time requirement (e.g., a road sign identification application installed on a self-driving vehicle needs to recognize the road sign in real-time).

These two new possibilities may be employed separately or independently in a given system, and may be utilized in preset ways (e.g., based on expected circumstances and possible states of the device) or dynamically based on inputs of a device's sensors. In some embodiments, a runtime resource scheduler may be used to make determinations of how to allocate available resources (including without limitation processing capacity, RAM or active memory availability, and power consumption limits) among multiple different applications or tasks that have multi-capacity deep learning capability. In some instances the runtime resource scheduler may be a modified version of the existing runtime scheduler of an operating system (e.g., the runtime scheduler of the Android operating system) or may be separate function that runs over the top of, and manages, the multi-capacity deep learning models (e.g., the scheduler and multi-capacity deep learning models may all be part of one application that provides computer vision capabilities).

In one embodiment, a device employing a multi-capacity deep learning model scheme can exploits these two new possibilities by encoding the inference accuracy and inference latency into a cost function for a computer vision application. This example demonstrates some of the principles and benefits of the resource-aware scheduling aspect disclosed herein. Let V denote the set of vision applications that are concurrently running on a mobile system, and let $A_{min}(v)$ and $L_{max}(v)$ denote a minimum inference accuracy and a maximum inference latency goal (which in the future be goals that are set by the user, determined by a manufacturer, or in the case of certain types of devices like drones or self-driving vehicles, may be regulated by law) for a vision application $v \in V$. Additionally, let $M_v$ denote the multi-capacity model of the application v, and let $m_v$ denote a descendant model $m_v \in M_v$. The cost function of the descendant model $m_v$ from v is defined as follows:

$$C(m_v, u_v, v) = (A_{min}(v) - A(m_v)) + \alpha \cdot \max\left(0, \frac{L(m_v)}{u_v} - L_{max}(v)\right) \quad (2)$$

where $A(m_v)$ is the inference accuracy of $m_v$, $u_v \in [0, 1]$ is the computing resource percentage allocated to v, is the inference accuracy of $m_v$, and $L(m_v)$ is the inference latency of $m_v$ when 100% of the computing resources the descendant model might consume are allocated to v, and $\alpha_v \in [0, 1]$ is the weight that determines the accuracy-latency tradeoff for v.

Essentially, the first term in the cost function promotes selecting a descendant model $m_v$ that has an inference accuracy that is as high as possible. The second term in the cost function represents the penalty for selecting a descendant model $m_v$ that has a processing latency higher than the maximum processing latency goal. Since video inputs are typically streamed at a dedicated framerate, there is no reward for achieving a processing latency lower than $L_{max}(v)$. The $\alpha \in [0, 1]$ can be thought of as a "knob" set by the user or developer to determine the latency-accuracy trade-off preference for a given model. A large a weights more on the penalty for latency, while a small a favors higher accuracy. A desirable approach for the above equation might be to select an appropriate descendent model for a given running application, and to determine the amount of available runtime resources to allocate to that model variant such that the cost function is minimized.

In one alternative, given the cost function of each descendant model of each concurrently running application, the resource-aware scheduler dynamically incorporates two scheduling schemes or approaches to coordinate and maximize the performance of concurrent vision applications for two different optimization objectives.

One scheduling scheme may aim to minimize the total computational cost of all concurrent vision applications. In one example, this optimization problem can be formulated as follows:

$$\min_{u_v, m_v \in M_v} \sum_{v \in V} C(m_v, u_v, v) \quad (3)$$

$$\text{s.t.} \sum_{v \in V} S(m_v) \leq S_{max}$$

$$\sum_{v \in V} u_v \leq 1$$

where $S(m_v)$ denotes the runtime memory footprint of the descendant model $m_v$. The total memory footprint of all the concurrently running neural network applications cannot exceed the maximum memory capacity of the mobile vision system denoted as $S_{max}$. Other similar approaches for minimizing computation cost may also be used, in which the scheduler would prefer to favor applications with lower costs and thus would be optimized to allocate more runtime resources to them. These categories of schemes can be thought of as minimum total cost schemes.

A second scheduling scheme can be used to minimize the cost of the deep learning application which has the highest cost. In one implementation, this optimization scheme can be formulated as follows:

$$\min_{u_v, m_v \in M_v} k \quad (4)$$
$$\text{s.t. } \forall v : C(m_v, u_v, v) \le k$$
$$\sum_{v \in V} S(m_v) \le S_{max}$$
$$\sum_{v \in V} u_v \le 1$$

where the costs of any given individual neural network application must be smaller than k, and the function attempts to minimize k. Other formulations of a "min/max" cost scheduling scheme can be used, for example schemes that would promote the scheduler to prefers to fairly allocate the runtime resources to all the concurrently running vision applications to balance their performance. These categories of schemes can be thought of as minimum max cost schemes.

Several different approaches could be employed to solve the nonlinear optimization problems involved in both scheduling schemes. In one approach, to enable real-time online scheduling in mobile systems, a form of greedy heuristic can be used to solve the optimization problems and/or approximate solutions. Specifically, a minimum indivisible runtime resource unit $\Delta u$ can be defined (e.g., 1% of CPU resource), for use in allocating available CPU resources among all running neural networks (which may include just those multi-capacity models managed by the scheduler, applications that do not have multi-capacity frameworks but for which the scheduler can obtain information regarding resource cost, or both). For a MinTotalCost scheduling scheme, some amount of $\Delta u$ can be allocated to the descendent model $m_v$ of the running application v such that $C(m_v, \Delta u, v)$ has the smallest cost increase among other running applications. For a MinMaxCost scheduling scheme, upon selecting the running application v with the highest cost $C(m_v, u_v, v)$, some amount of $\Delta u$ can be allocated to v and the optimal descendent model $m_v = \arg\min_{mv} C(m_v, u_v, v)$ is chosen for v. For both scheduling schemes, resource allocation can be done in sequential, incremental steps until the runtime resource is exhausted or the cost stops increasing, or resources can be allocated in larger blocks depending on known importance of accuracy versus latency for a given application.

In some embodiments where runtime demand of the scheduler is an important consideration, he runtime of executing such a greedy heuristic approach can be further shortened via a caching technique. This is particularly attractive to mobile systems with very limited resources. When allocating computing resources, instead of starting from zero and incrementally adding $\Delta u$, the process can instead start from the point where a certain amount of CPU resources have already been allocated. For example, the scheduler could cache an unfinished running scheme where 70% CPU resources have been allocated during optimization. In the next optimization iteration, the scheduler could directly start from the unfinished running scheme and allocate the remaining 30% CPU resources, thus saving 70% of the optimization time. To prevent falling into a local minimum over time, a complete execution of the greedy heuristic may be performed periodically to ensure the cached solution is close to the optimal solution.

Evaluations and Illustrative Results of Multi-Capacity Models

To further demonstrate the various features, benefits, and capabilities of a multi-capacity deep learning model approach, two types of vision tasks can be used as examples: 1) generic-category object recognition, and 2) specific-class object recognition.

A Generic-Category Object Recognition type of vision tasks aims at recognizing the generic category of an object (e.g., a road sign, a person, or an indoor place). To demonstrate, three datasets were chosen, each containing a small, a medium, and a large number of object categories respectively, representing an easy, a moderate, and a difficult vision task correspondingly:

CIFAR-10: This dataset contains 50K training images and 10K testing images, which belong to 10 generic categories of objects.

ImageNet-50: This dataset is a subset of the ILSVRC ImageNet. It contains 63K training images and 2K testing images, which belong to 50 object categories based on the popularity ranking provided by the ImageNet website.

ImageNet-100: Similar to ImageNet-50, this dataset is a subset of the ILSVRC ImageNet. It contains 121K training images and 5K testing images, which belong to top 100 most popular object categories based on the popularity ranking provided by the ImageNet website.

A Specific-Class Object Recognition type of vision task aims at recognizing the specific class of an object within a generic category (e.g., a stop sign, a female person, or a kitchen). To demonstrate, 3 object categories were selected, 1) road signs, 2) people, and 3) places, and the following image databases were used:

GTSRB: This dataset contains over 50K images that belong to 43 classes of road signs such as speed limit signs and stop sign.

Adience-Gender: This dataset contains over 14K images of human faces of two genders.

Places-32: This dataset is a subset of the Places365-Standard dataset. Places365-Standard contains 1.8 million images of 365 scene classes that belong to 16 higher-level categories. Two representative scene classes were selected (parking lot and kitchen) from each of the 16 higher-level categories and obtain a 32-class dataset that consists of over 158K images.

To evaluate the capabilities and adaptability of a multi-capacity deep learning model approach on different deep neural network models, two representative DNN models were chosen for testing: 1) VGG-16 and 2) ResNet-50. VGG-16 is a comparatively simple DNN models to implement, whereas ResNet-50 is a more complex but higher-performing DNN model.

Without loss of generality, CIFAR-10, GTSRB and Adience-Gender were randomly assigned to VGG-16; and ImageNet-50, ImageNet-100 and Places-32 were randomly assigned to ResNet-50 to create six mobile vision applications labeled as VC (i.e., built on the VGG-16 model trained on the CIFAR-10 dataset), RI-50, RI-100, VS, VG, and RP, respectively.

Each of the DNN models was trained and tested, and then transformed into a multi-capacity model in accordance with the processes described herein. In other words, the "offline"

phases of generating a multi-capacity model were performed for each of the DNN models. The datasets, DNN models, and mobile vision applications are summarized in Table 2.

| Type | Dataset | DNN Model | Mobile Vision Application |
|---|---|---|---|
| Generic Category | CIFAR-10 | VGG-16 | VC |
| | ImageNet-50 | ResNet-50 | RI-50 |
| | Image Net-100 | ResNet-50 | RI-100 |
| Specific Class | GTSRB | VGG-16 | VS |
| | Adience-Gender | VGG-16 | VG |
| | Places-32 | Restbt-50 | RP |

Optimized Resource-Accuracy Tradeoffs. In the experiments discussed in this section, a multi-capacity model containing five descendant models was created for each of the six mobile vision applications. These descendant models were designed to have diverse resource-accuracy profiles, for the purpose of demonstrating that a multi-capacity model can enable applications to run even when available resources are very limited. It should be noted that a multi-capacity model is not limited to one particular set of resource-accuracy profiles, is not limited to a linear or uniform difference between each descendant model or variant, the number of descendant models is not limited to five capabilities, and multiple nestings of capabilities are possible (e.g., one nested set of capabilities for optimizing accuracy/latency, another for optimizing performance/power consumption, or another for optimizing inference confidence or accuracy versus memory usage). In other words, a multi-capacity model or models in accordance with the teachings of this disclosure can be made flexibly, based on user preferences and other circumstances in which the model will be used.

The multi-capacity models created in this experiment were then compared against a series of baseline models. To make a fair comparison, the same architecture of descendant models was used as for baseline models, such that their model sizes and computational costs were effectively the same. Moreover, the baseline models were pretrained on an ImageNet dataset and then fine-tuned on each of the six selected datasets. Such a pre-training technique is one effective way to boost inference accuracy of a deep learning model, and thus shows that the multi-capacity model's advantages hold up even for highly tuned deep learning models. However, for purposes of further comparison, the baseline models were also generated without pre-training, to confirm that these baseline models with pre-training did outperform those without pre-training. Pretraining of a base model can also be used as a preliminary step before the "offline" phase of generating a multi-capacity model.

Figure 6:
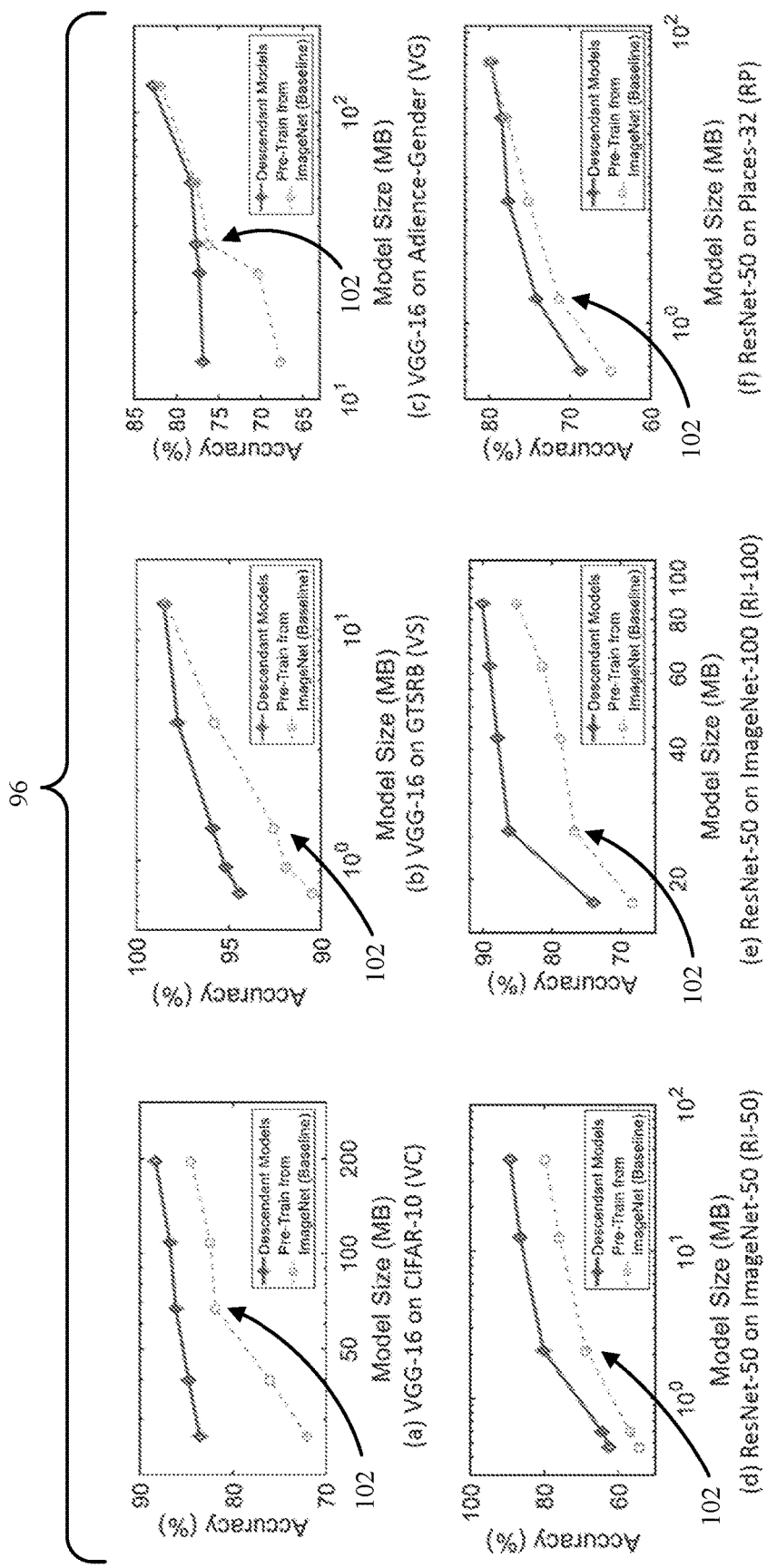
FIG. 6 is a set of graphs illustrating advantages of using techniques disclosed herein.

FIG. 6 shows several comparison graphs 96 that illustrate the results of comparison testing between multi-capacity models and the baseline models across the six experimental mobile vision applications (VC, RI-50, RI-100, VS, VG, and RP, as identified in Table 2). For each application, the graphs show the test accuracies of both the descendant models of the multi-capacity model and baseline models as a function of model size. For better illustration purposes, the horizontal axis is plotted using the logarithmic scale.

The graphs 96 show several notable characteristics and advantages of multi-capacity models. First, it can be seen that descendant models consistently achieve higher accuracies than baseline models at every model size across all of the six experimented mobile vision applications. On average, the descendant models achieved 4.98% higher accuracy than baseline models across the six applications. This indicates that the descendant model at each capacity (in other words, at each "size" of the model) is able to deliver excellent inference accuracy under a given memory budget. Second, it can be seen that smaller descendant models outperform baseline models more than larger descendant models. On average, the two smallest descendant models achieve 6.68% higher accuracy while the two largest descendant models achieve 3.72% higher accuracy compared to their corresponding baseline models. This is because a TRR approach was able to preserve important filters, while pruning less important ones. Thus, despite having a small capacity, a small descendant model benefits in a more focused manner from these important filters while the corresponding baseline model does not.

Figure 7:
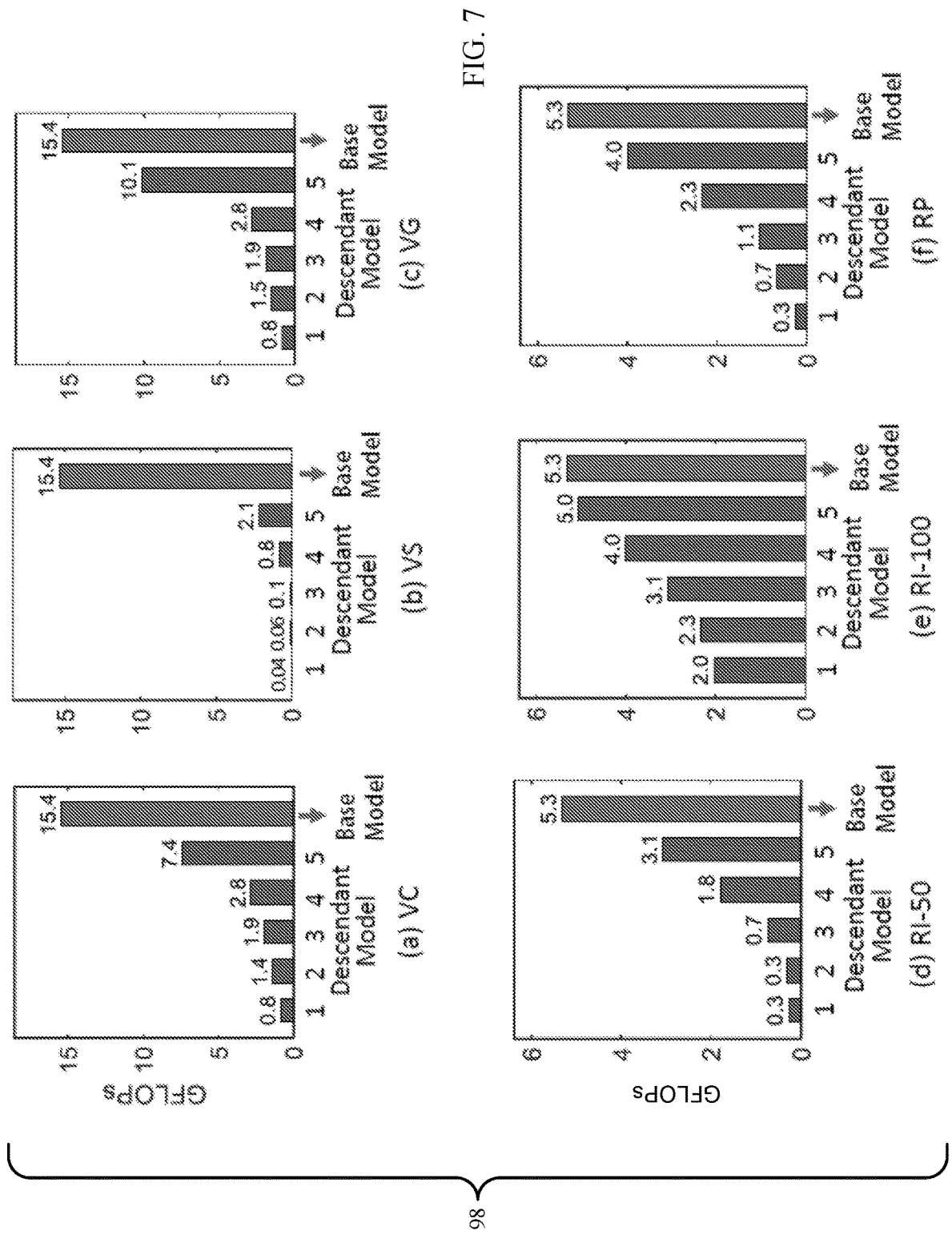
FIG. 7 is a set of bar graphs demonstrating advantages of using techniques disclosed herein.

FIG. 7 comprises a set of bar graphs 98 showing the computational costs of five descendant models and the corresponding baseline models of six mobile vision applications in terms of the unit of GFLOP (i.e., GigaFLOP). As can be seen, all descendant models have less GFLOP compared to the corresponding baseline models. This result quantitatively demonstrates the benefits of utilizing a filter pruning phase in generating a multi-capacity model, as explained above. Moreover, it indicates that a filter pruning phase of a multi-capacity approach is able to effectively reduce the computational costs across six mobile vision applications, demonstrating the generalization of this approach on different deep learning models trained on different datasets.

Reduction on Memory Footprint. Another feature of multi-capacity model architectures is the sharing of parameters among descendant models. This, of course, saves valuable memory space, particularly in situations like mobile devices where size, weight, and other constraints may not allow for sizable memory capacity. To quantify the benefit of parameter sharing on reducing memory footprint, one can compare the model size of multi-capacity models with the accumulated model sizes of the five descendant models as if they were independent.

Table 3 lists comparison results across the six tested mobile vision applications. As can be seen, the model size of the multi-capacity model is smaller than the corresponding accumulated model size for every application. Moreover, the deep learning models with larger model sizes benefit even more from parameter sharing. For example, VC has the largest model size across the six baseline applications. With parameter sharing, it achieves a reduced memory footprint of 241.5 MB. Finally, in a circumstance where all six applications were running concurrently, the multi-capacity model would achieve a reduced memory footprint of 587.4 MB, demonstrating the enormous benefit of multi-capacity model on memory footprint reduction.

TABLE 3

| Application | Multi-Capacity Model Size (MB) | Accumulated Model Size (MB) | Reduced Memory Footprint (MB) |
|---|---|---|---|
| VC | 196.0 | 437.5 | 241.5 |
| VS | 12.9 | 19.8 | 6.9 |
| VG | 123.8 | 256.0 | 132.2 |
| RI-50 | 42.4 | 58.1 | 15.7 |
| RI-100 | 87.1 | 243.5 | 156.4 |
| RP | 62.4 | 97.1 | 34.7 |
| All Included | 524.6| | 1112.0 | 587.4 |

Another benefit of parameter sharing made possible through multi-capacity model architectures as disclosed herein is a reduction in model switching overhead, as noted above. To quantify this benefit, one could consider all the possible model switching cases among the five descendant models of each multi-capacity model, and calculate the average page-in and page-out overhead for model upgrade and model downgrade, respectively. This can then be compared with the case where descendant models are treated as if they were independent, rather than shared within the same multi-capacity structure.

Table 4 lists comparison results across all six mobile vision applications for model upgrade. As expected, the average page-in and page-out overhead of independent models during model switching is larger than the overhead of multi-capacity models for every application. This is because during model switching, independent models need to page in and page out the entire models while multi-capacity model only needs to page in a very small portion of the models. It should be noted that the page-out overhead of multi-capacity model during model upgrade is zero. This is because the descendant model with smaller capability is a part of the descendant model with larger capability, and thus it does not need to be paged out.

TABLE 4

| Application | Multi-Capacity Model Upgrade Overhead (MB) | | Independent Models Upgrade Overhead (MB) | |
|---|---|---|---|---|
| | Page-In | Page-Out | Page-In | Page-Out |
| VC | 81.4 | 0 | 128.2 | 46.8 |
| VS | 1.3 | 0 | 1.7 | 0.3 |
| VG | 50.0 | 0 | 76.2 | 26.2 |
| RI-50 | 19.2 | 0 | 21.2 | 2.0 |
| RI-100 | 38.3 | 0 | 67.9 | 29.5 |
| RP | 26.4 | 0 | 34.9 | 4.6 |

Table 5 lists comparison results across all six mobile vision applications for model downgrade. Similar results are observed, although it is noted that during model downgrade, the page-in overhead of the multi-capacity model is zero.

TABLE 5

| Application | Multi-Capacity Model Downgrade Overhead (MB) | | Independent Models Downgrade Overhead (MB) | |
|---|---|---|---|---|
| | Page-In | Page-Out | Page-In | Page-Out |
| VC | 0 | 81.4 | 46.8 | 128.2 |
| VS | 0 | 1.3 | 0.3 | 1.7 |
| VG | 0 | 50.0 | 26.2 | 76.2 |
| RI-50 | 0 | 19.2 | 2.0 | 21.2 |
| RI-100 | 0 | 38.3 | 29.5 | 67.9 |
| RP | 0 | 26.4 | 4.6 | 34.9 |

Figure 8:
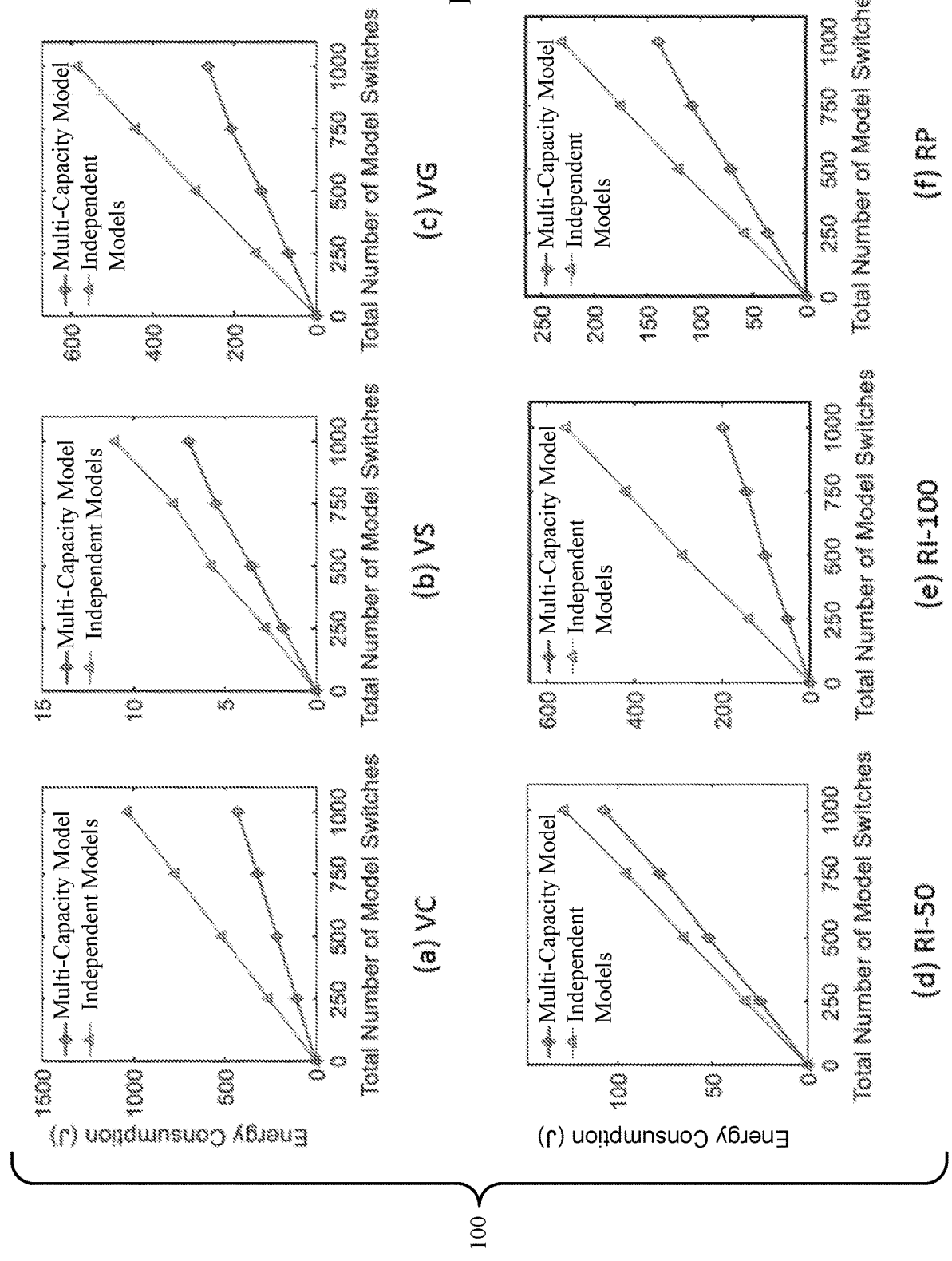
FIG. 8 is a set of graphs illustrating advantages of using techniques disclosed herein.

Experimental testing also evaluated model switching overhead in terms of energy consumption. Specifically, energy consumption was measured by randomly switching models 250, 500, 750, and 1000 times using descendant models and independent models, respectively. FIG. 8 shows a series of graphs 100 containing comparison results across all six mobile vision applications. As shown, energy consumed by switching multi-capacity models is lower than switching independent models for every application. This benefit becomes more prominent when the model size is large. For example, the size of the largest descendant model of VC and VS is 196.0 MB and 12.9 MB, respectively. The corresponding energy consumption reduction for every 1000 model switches is 602.1 J and 4.0 J, respectively. As noted above, energy consumption could also be a factor taken into account in the scheduler function. If a device were low on energy, the scheduler could reduce the number of model switching and instead remain with a comparatively lower sized model. Likewise, if a device were low on energy or overheating, the scheduler could be programmed to become more averse (e.g., "penalize" it its minimization function) to using larger sized descendant models to reduce computational needs (except, perhaps, in the case of a neural network for which high accuracy was important to the overall function of the device—like navigation of a drone).

Taken together, multi-capacity model significantly reduces model page-in and page-out overhead, making model switching extremely efficient. This also leads to a significant reduction on energy consumption, which is important for mobile systems. This benefit becomes more prominent when model switching frequency increases.

Evaluations and Illustrative Results of Resource-Aware Scheduling

In further testing to demonstrate the features of multi-capacity deep learning model methods as disclosed herein in real world mobile devices, the six mobile vision applications described above were implemented on three smartphones: Samsung Galaxy S8, Samsung Galaxy S7, and LG Nexus 5, all running Android OS 7.0. A Monsoon power monitor application was used to measure the power consumption of these devices. While measuring the power consumption, all irrelevant services of the Android OS were turned off as well as the smartphone screen. Consistent experimental results were achieved across all three smartphones.

For a "baseline," the model located at the "knee" of every yellow/baseline curve in FIG. 6 was used for each of the tested mobile vision applications. This is the model that offers the best resource-accuracy tradeoff among all the model variants. These baselines were employed in a benchmark that simulates runtime application queries in different scenarios. Specifically, the benchmark creates a new application or kills a running application with certain probabilities at every second. The number of concurrently running applications is from 2 to 6. At the same time, the maximum available memory to run concurrent applications is set to 400 MB. Each simulation generated by the benchmark lasted for 60 seconds. The simulation was repeated 100 times to assess the average runtime performance.

Figure 9:
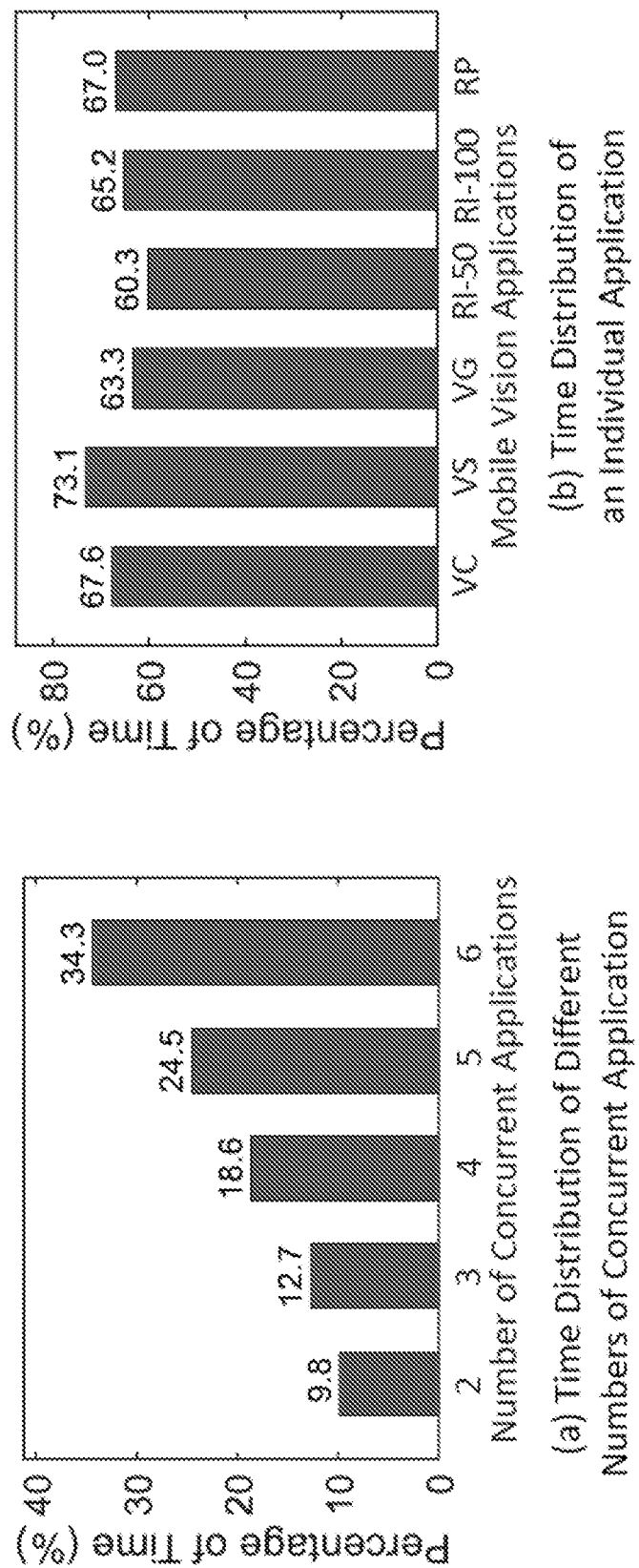
FIG. 9(a) is a graph that shows the time distribution of different numbers of concurrently-running applications in a benchmark experiment.
FIG. 9(b) is a graph that shows the running time distribution of each individual application in the benchmark experiment used for FIG. 9(a).

FIG. 9 is a set of bar graphs that illustrate the profiles of all accumulated simulations generated by the benchmark experiment. FIG. 9(a) shows the time distribution of different numbers of concurrently-running applications. As shown, the percentage of time when two, three, four, five and six applications were running concurrently is 9.8%, 12.7%, 18.6%, 24.5% and 34.3%, respectively. This distribution shows that the benchmark experiment covered all the numbers of concurrent applications. FIG. 9(b) shows the running time distribution of each individual application. As shown, the running time of each application is evenly distributed, indicating the benchmark experiment ensured a fair time share among all applications.

The following two metrics can be used to evaluate the performance of a runtime scheduler designed in accordance with the disclosure herein.

Accuracy Gain. Since the absolute accuracies achieved by the six vision applications are not in the same range, accuracy gain over the baseline within each application can be used as a more meaningful metric.

Frame Rate. Frame rate can be used as a metric to measure the real-time performance of a vision application. Frame rate is inversely proportional to inference latency. The lower the inference latency is, the higher the frame rate is.

Figure 10:
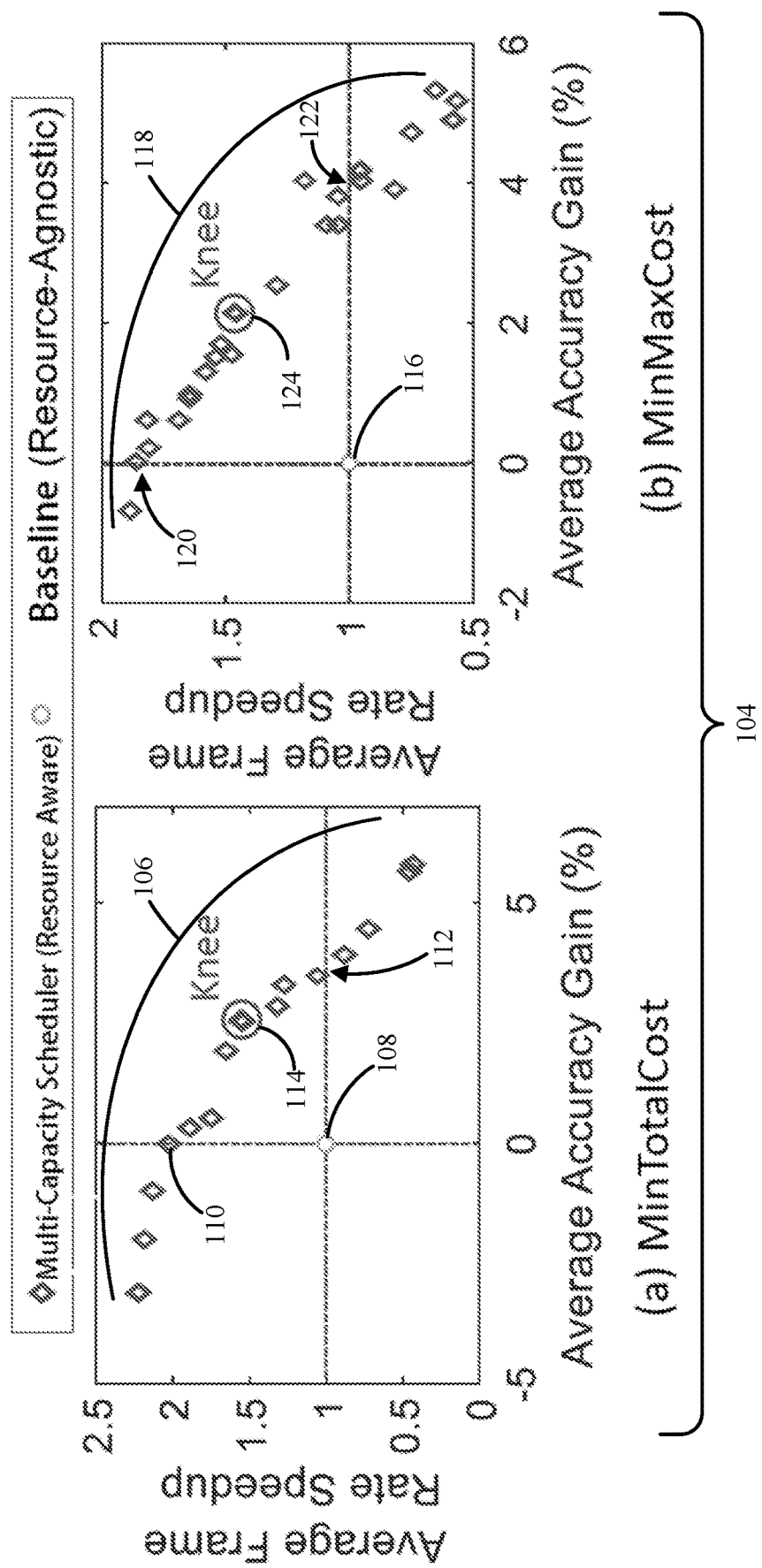
FIG. 10(a) is a graph that shows a comparison between the baseline and multi-capacity versions under a MinTotalCost scheduling scheme.
FIG. 10(b) is a graph that shows a comparison between the baseline and multi-capacity deep learning model under a MinMaxCost scheduling scheme.

FIG. 10 comprises two graphs 104 that illustrate a comparison between the baseline (circle) and multi-capacity (diamond plots) versions of scheduling. FIG. 10(a) shows the comparison between the baseline and multi-capacity versions under the MinTotalCost scheduling scheme discussed above. Each blue diamond marker 106 represents the runtime performance obtained by scheduling with a particular a in the cost function generally described above. The yellow circle 108 represents the runtime performance of the baseline.

From these graphs 104 it can be seen that by adjusting the value of a, the multi-capacity model scheduler is able to provide a variety of tradeoffs between accuracy and frame rate. In contrast, the baseline is fixed and offers no tradeoff between accuracy and frame rate. In addition, as depicted the vertical line and the horizontal line connecting at the circles 108 partition the figure into four quadrants. The upper right quadrant represents a region that has both higher accuracy gain and higher frame rate compared to the baseline. As shown, there are many blue diamond markers 106 located within this upper right quadrant. At each of those blue diamond markers 106, the multi-capacity model methods disclosed herein are able to achieve both higher accuracy gain and higher frame rate compared to the baseline 108. In particular, when considering 3 of those blue diamond markers 106 in particular, the runtime performance improvement achieved by the multi-capacity model methods disclosed herein can be seen even more demonstratively. Specifically, when the selected descendant capability variant 110 of the multi-capacity model has the same accuracy gain as the baseline, the multi-capacity variant achieves 2.0× frame rate compared to the baseline 108. When the selected descendant capability variant 112 of the multi-capacity model has the same frame rate as the baseline, the multi-capacity variant achieves a 4.1% accuracy gain compared to the baseline. Finally, at the "knee" 114 of the blue diamond curve, which offers the best accuracy-frame rate tradeoff among all the α, the descendant capability variant 114 of the multi-capacity model achieves 1.5× frame rate and 2.6% accuracy gain compared to the baseline 108.

FIG. 10(b) shows the comparison between the baseline 116 and multi-capacity deep learning model 118 under the MinMaxCost scheduling scheme. When the scheduler has selected a multi-capacity deep learning module descendant 120 that has the same accuracy gain as the baseline, the descendant model achieves 1.9× frame rate compared to the baseline 116. When the scheduler has selected a multi-capacity deep learning module descendant 122 has the same frame rate as the baseline 116, the descendant model achieves a 4.2% accuracy gain compared to the baseline. At the "knee" 124, the descendant model achieves a 1.5× frame rate and a 2.1% accuracy gain compared to the baseline.

Figure 11:
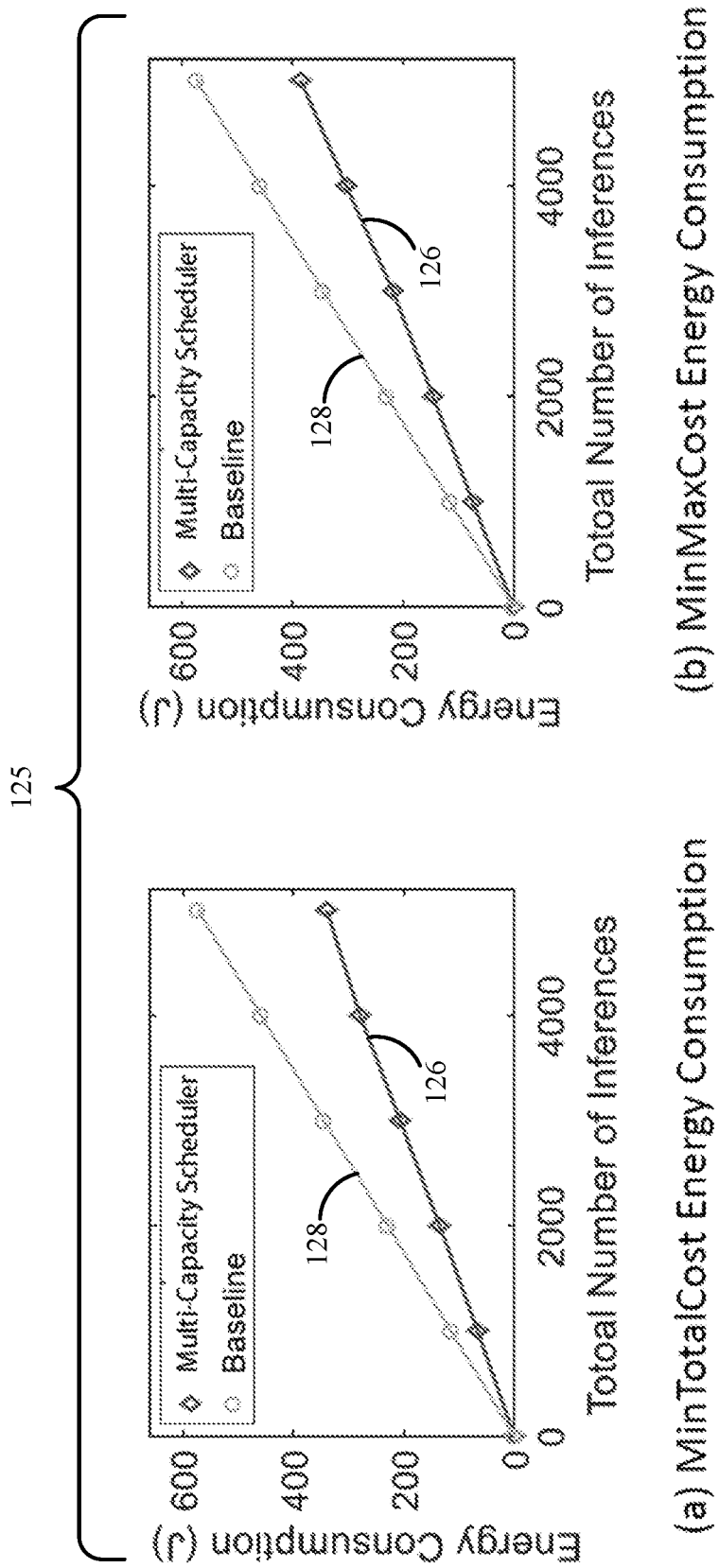
FIG. 11(a) is a graph that shows a comparison between the baseline and multi-capacity model examples under the MinTotalCost scheduling.
FIG. 11(b) is a graph that shows the comparison between the baseline and multi-capacity model under the MinMaxCost scheduling scheme.

FIG. 11 comprises two graphs 125 that demonstrate a comparison between the baseline and multi-capacity model examples. FIG. 11(a) shows a comparison between the baseline and multi-capacity model examples under the MinTotalCost scheduling scheme generally described above. Across different numbers of inferences, the multi-capacity model 126 achieves an average 1.7× energy consumption reduction compared to the baseline 128. Similarly, FIG. 11(b) shows the comparison between the baseline 128 and multi-capacity model 126 under the MinMaxCost scheduling scheme. The multi-capacity model 126 achieves an average 1.5× energy consumption reduction compared to the baseline 128.

Example Implementations of Multi-Capacity Model Systems and Methods

Figure 12:
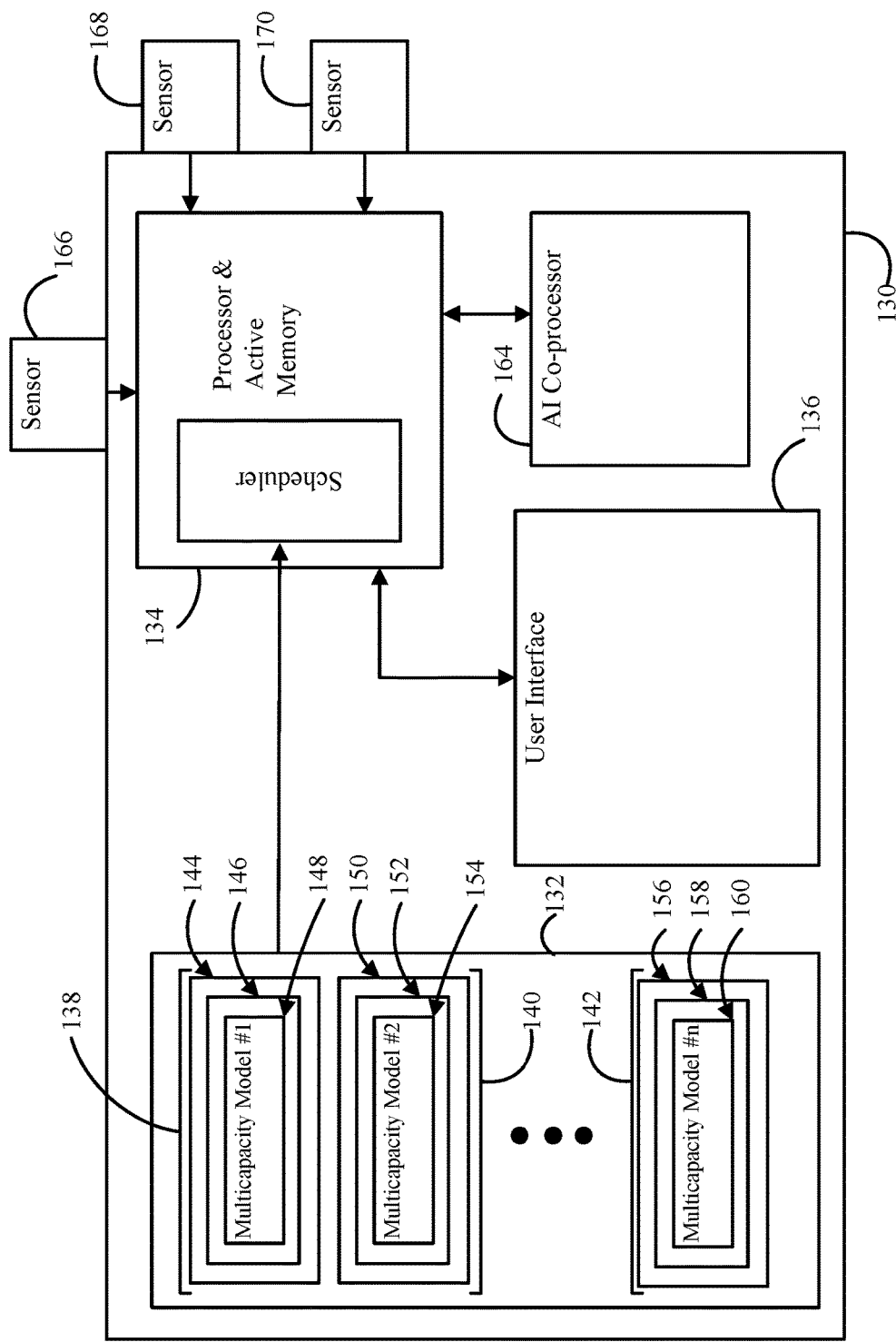
FIG. 12 is a functional block diagram showing aspects of a mobile device in accordance with various systems disclosed herein.

Mobile Device Utilizing Multi-capacity Models. FIG. 12 is a diagram showing an example of a mobile device 130 that may be programmed in accordance with various methods and alternatives disclosed herein. For example, the device may be a mobile phone or tablet, or could also represent other mobile devices such as autonomous vehicles, drones, traffic or security monitoring devices, disability (e.g., hearing or vision impairments) assistance devices, secure defense or intelligence monitoring devices, augmented or virtual reality devices, or the like. The device 130 generally comprises a memory storage 132 (which may be a long term memory or a shorter term or active memory), a processing unit 134 (which may comprise both a main microprocessing unit and associated active memory, or the active memory may be a separate unit), and a user interface 136 (which may be part of the device 130, or may be a separate unit that is connected by any suitable connection, such as Bluetooth).

In the main memory 132, a number of multi-capacity deep learning models 138, 140, and 142 are shown. In practice, any number of multi-capacity deep learning models may be stored in memory 132 provide space constrains of the device 130 allow for it. Each of the multi-capacity models has a seed model (148, 154, and 160 respectively) that shares its parameters with at least one other descendant model. For purposes of illustration, multi-capacity model #1 138 comprises a seed model 148, an intermediate descendant model 146 which comprises all of the filters in each layer of the seed model 148 plus additional filters, and a full descendant model 144, which comprises all of the filters in each layer of the seed model 148 and intermediate model 144 plus additional filters. In operation, and as discussed above, the number of descendant models may vary according to user preferences or may be tailored to the particular type of device 130, the functions or tasks to be performed by each multi-capacity model 138-142, and anticipated operating conditions and requirements of the device 130.

The processor 134 may be the only processor of the device 130, or may be coupled to an associated AI coprocessor 164, such as a deep learning specific chipset. In operation, the processor runs an operating system of the device 130 which includes a resource aware scheduler 162. The processor 134 receives input from various sensors 166-170, which may include an onboard front facing camera 170 and microphone 168, as well as a rear facing camera 166. Alternatively, in drones or vehicle-based embodiments, the sensors may include a variety of sensors designed to detect surroundings, such as optical, laser or lidar, radar, acoustic, and infrared sensors. The processor 134 is also coupled to a user interface 136, which may include a touchscreen or other input device. In other embodiments, the sensors 166-170 may be located in a remote device, such as a drone, and the processor 134, memory 132, and user interface 136 may be part of a tablet or other computing device 130 that controls the drone through remotely receiving the input of sensors 166-170 and returning commands to the drone based on inferences made by the multi-capacity models 138-142.

Depending on the purpose of the device 130, the processor 134 may run the resource aware scheduler 162 immediately upon boot up, or may call the scheduler only at the time an application or task is needed that is based on a multi-capacity deep learning model. Upon receiving a request from the user interface 136 for such an application or task to be run, the scheduler performs a resource-aware determination of the appropriate descendant model 150-154 of a multi-capacity model 140 to page into active memory and run. That descendant model could then run on successive input from a sensor 166 until the scheduler determines that available resources (either of the processor 134 or of the coprocessor 164) require a larger or smaller descendant be used, at which time the corresponding additional filters (for a larger model) would be paged in or filters in active memory would simply be discarded to reduce the model in active memory to the next lower sized descendant model. Alternatively, if a multi-capacity model running in processor 134 or coprocessor 164 for a gross identification function (e.g., such as inferring whether an input stream contains a person) identifies that a more refined or targeted model is needed (e.g., a facial recognition model to identify the particular person in the input stream), the scheduler 162 may instead initiate running the second, more refined model. At that time, the scheduler can decide both (i) what resource/accuracy/latency tradeoff is most appropriate for the second model and call the appropriate descendant model based on its model profile, and (ii) whether the currently running model should be switched (e.g., upon the next frame to be analyzed of a input video stream) for a lower or higher capability model.

The scheduler 162, or a deep learning model preference database to be accessed by the scheduler, may be updated from time to time for each multi-capacity model that it manages. For example, in one embodiment, developers of each deep learning model that will be transformed into a multi-capacity model can provide metadata concerning the latency and accuracy tolerances and importances for the particular task the model is trained to perform. The scheduler 162 could then take these tolerances and preferences into account in a scheduling scheme in which resource preference is given to certain models based on how important their task is to critically important functions of the device 130 (e.g., a gross vision application for an autonomous vehicle or drone). Likewise, the scheduler 162 could be a learning scheduler in which, over time based on trends, the scheduler learns to predict when a user will call certain deep learning models, or which models tend to be running at the same time, and so can adjust its resource allocation with a predictive or forward looking factor taken into account (e.g., preserving some resource allocation based on an expected large model that may be called).

The scheduler can also take into account the particular processing strengths and limitations of the device 130 when selecting descendant models 150-154 of a multi-capacity model. This feature could be exploited to substantially reduce the workload of an app developer who might otherwise need to independently design, code, and compress a deep learning-based app for each tablet, phone, watch, etc. in which the app might be used to ensure it is optimized for the resources of the particular device.

Method and Cloud Service for Creating Multi-capacity Models. Another potential embodiment of the various methods and teachings herein is to implement a system and method for generating deep learning models capable of adaptive model compression and recovery, as described above. In one example, a software development tool (e.g., TensorFlow and PyTorch (i.e., tools offered by Google and Facebook)) could be a visual/graphical software development studio, or a text-based software development application operating on a server or a local computer. The tool may be used to assist an unsophisticated software developer with limited deep learning domain expertise or other user to generate an application that employs deep learning techniques. The user could input various desired application requirements (e.g., accuracy, inference latency, storage size, power consumption), and information about potential platforms on which the application might be run, and the tool could automatically (and without the knowledge or without input from the user) determine an appropriate class of deep learning model to use and/or generate a deep learning model that has some or all of the characteristics described herein for adaptive model compression. For example, if the user's desired end-application will use deep learning to identify specific features in video streams, images, audio recordings, or the like the tool could select from among a list of common convolutional neural networks predetermined to be useful for the selected use case. In an alternative embodiment, a user may simply upload a training data set (e.g., a set of images or video files) rather than identify a specific task for the deep learning.

In another example, a development platform could offer a user an option to modify their custom deep learning model, or an existing or "off-the-shelf" deep learning models into multi-capacity models as a service offering to software developers.

In certain embodiments it may also be advantageous for the user to provide certain information on the potential platforms in which the application may run. For example, a user might identify that the desired end-application will be an iOS application, an Android application, or the like, or may indicate certain attributes of the processing environment (e.g., indicating that the application will run on a drone that has a certain amount of available processing power and memory during operation, taking into account resource demands from the normal baseline operational requirements of the drone).

These tools could be run in a network or cloud environment or on a local system. In a cloud environment, the processing power of a network of servers could be used to run (from a network or cloud memory) a program which inputs a deep learning model and outputs a multi-capacity model per the techniques described herein. In this way, a user, from the user's own computer or other local processing device, a user could upload a model or a set of design requirements via a standard Internet connection (or an internal LAN connection to a local server) for processing by the server. In one configuration, the user could upload a trained deep learning model. In another configuration, the user could upload an un-trained deep learning model and a training dataset (or simply direct the server to an appropriate training data set).

Figure 13:
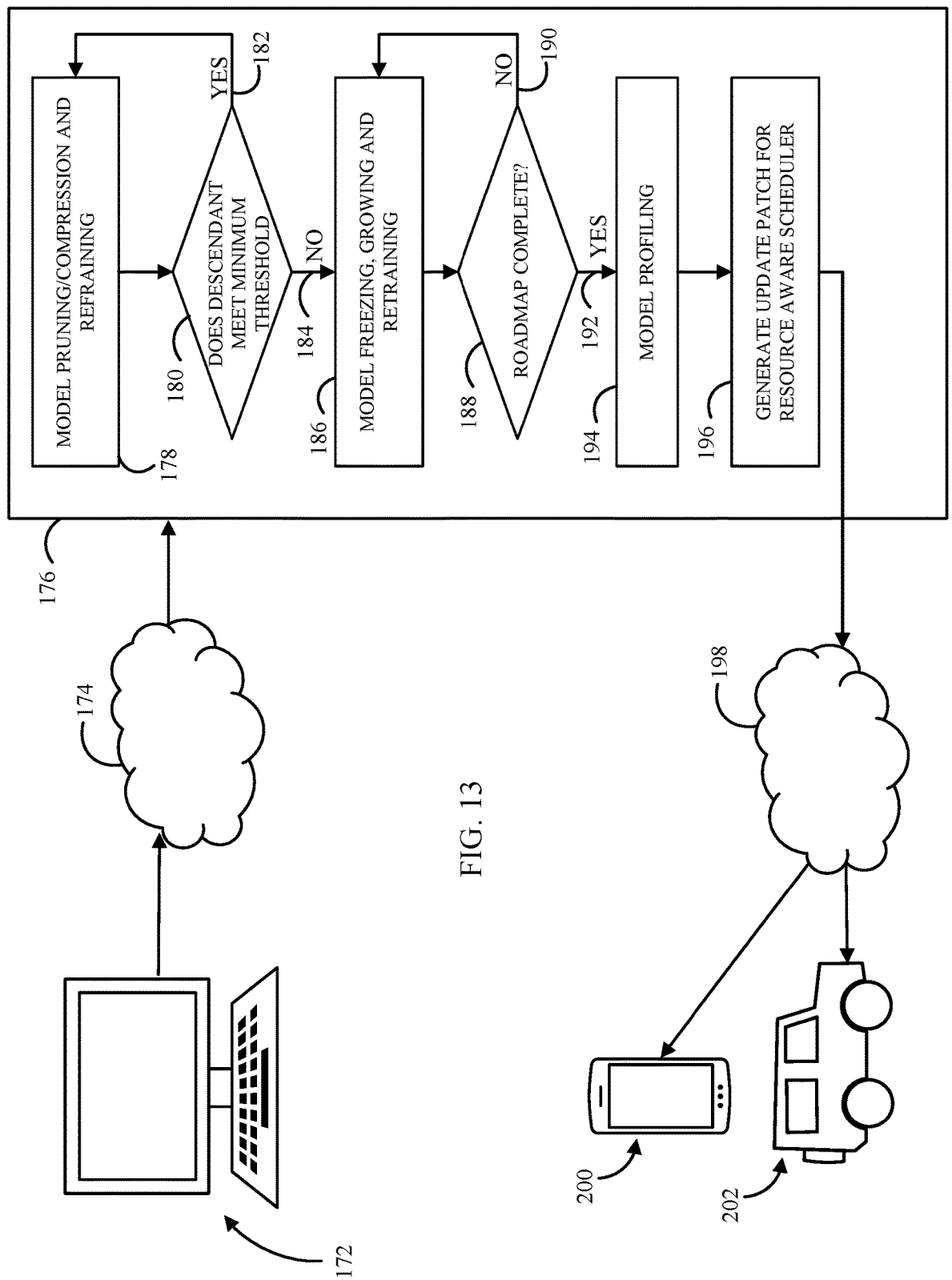
FIG. 13 is a diagram and flowchart depicting one embodiment of a method in accordance with techniques disclosed herein.

For purposes of demonstration of the above examples, FIG. 13 comprises a functional block diagram illustrating an arrangement for utilizing methods disclosed herein to provide a multi-capacity model creation service. A software developer 172 (whether an individual, business, government, or other institution) may create an application that utilizes one or more deep learning models (the models may be trained or untrained). The application might be a stand-alone "app" intended to be used cross-platform, or may be a proprietary software intended to be installed and used for a particular product (e.g., a drone or surveillance unit). The developer may then upload the application in its entirety, or merely the deep neural network, via a network or cloud connection 174. In one embodiment, the developer also provides the training dataset for the neural network, metadata indicating accuracy, latency, and other performance preferences and tolerances for the model, the desired degree of flexibility to be provided by the multi-capacity model to be created (e.g., preferences concerning the number of descendant models to be made and/or the differences between the models).

A remote resource 176 (e.g., a virtual server) of the multi-capacity model service provider then conducts the "offline" stage, described above, of creating a multi-capacity model from the uploaded neural network. The process entails conducting pruning and model retraining 178 in an iterative process according to the methods described above with respect to FIG. 1. At each iteration, the process determines at step 180 whether the current pruned/retrained descendant model meets minimum threshold requirements provided by the developer (or which the service provider determines). If it does 182, the process performs another model pruning and retraining phase 178. If the current descendant model does not meet the threshold requirements 184, the iterations cease and the process continues to the model freezing and regrowing phase 186. This phase, in turn, iteratively continues, with a determination step 188 made for each iteration of whether the roadmap recorded during the pruning step 178 has been completed (i.e., the desired number of descendant models have been grown from the seed model). If not, the iterative growth process continues 190. If all logs in the roadmap have been accounted for 192, the process continues to the model profiling stage 194. Once the model profile is created describing the tradeoffs and attributes of each descendant model, an optional update patch or other file can be created that will, once installed in a device that will utilize the multi-capacity model, provide the scheduler of that device sufficient information about how and when to decide which descendant model should be used for the task associated with the model.

After the multi-capacity model, model profile, and scheduler update files have been created, they can then be uploaded to an app store or marketplace, or simply returned to the developer. In one embodiment, the multi-capacity model is recombined with the application that it supports and the application is made available to users via an app store or marketplace 198. Because of the flexibility afforded by utilizing the multi-capacity scheme, the same deep learning model (or even the same application) can be used by a mobile phone 200 (which may have a sophisticated and modern mobile processor) as well as an older model vehicle 202 that may have significantly less computational resources available onboard.

The multiple features and advantages of the systems and methods disclosed herein have been described in terms of one or more preferred embodiments and/or through use of various illustrative examples. However, it should be appreciated that many equivalents, alternatives, variations, and modifications, aside from those expressly stated, are possible and within the scope of the invention.

We claim:

1. A method for generating a multi-capacity neural network comprising:
   obtaining a baseline deep learning model;
   creating at least one reduced deep learning model from the baseline model;
   recording a difference between the reduced deep learning model and the baseline deep learning model;
   generating a multi-capacity model comprising the reduced deep learning model and at least one other deep learning model using the recorded difference, wherein the reduced deep learning model shares its content in a nested arrangement with the at least one other deep learning model; and
   storing the multi-capacity model in a memory such that the reduced deep learning model and the at least one other deep learning model are selectively accessible by a processor.

2. The method of claim 1, further comprising the step of generating a model profile for the reduced deep learning model and the at least one other deep learning model.

3. The method of claim 1, wherein the step of generating a multi-capacity model further comprises training the at least one other deep learning model.

4. The method of claim 3, wherein shared content of the reduced deep learning model is held substantially static while the at least one other deep learning model is trained.

5. The method of claim 1, wherein the creating the at least one reduced deep learning model from the baseline model comprises:
   creating a pruned deep learning model from the baseline model; and
   creating the at least one reduced deep learning model from the pruned deep learning model,
   wherein the creating of the pruned deep learning model comprising:
      identifying a plurality of triplets of a plurality of input datasets, each triplet comprising: an anchor input dataset, a negative input dataset, and a positive input dataset of a respective input dataset of the plurality of input dataset;
      creating a sum of a plurality of residuals for each filter of a plurality of filters in the baseline model, each residual determined based on a first difference between the anchor input dataset and the negative input dataset and a second difference between the anchor input dataset and the positive input dataset of a respective triplet of the plurality of triplets; and
      creating the pruned deep learning model by pruning a set of filters of the plurality of filters in the baseline model based on the sum for each filter of the plurality of filters in the baseline model.

6. A persistent memory storage, having stored thereon a set of instructions that, when executed by a processor, cause the processor to:
   initiate a resource-aware runtime scheduler that encodes an inference accuracy and processing latency of each of a number of descendent models of a number of concurrently running applications into a cost function;
   provide the scheduler with dynamic information concerning runtime resources; and
   based on an output of the scheduler in response to the dynamic information, select a resource-accuracy trade-off scheme for a set of concurrently running deep learning models of the concurrently running applications, and determine a optimal amount of runtime resources to allocate to each model to jointly maximize an overall inference accuracy and minimize an overall processing latency of all the concurrently running applications.

7. The memory storage of claim 6, wherein the instructions further cause the processor to obtain from a user an indication of inference accuracy threshold for a given one of the number of concurrently running applications, and to avoid selecting a resource-accuracy trade-off for the given running application that reduces accuracy below the threshold.

8. The memory storage of claim 7, wherein the instructions wherein the indication of inference accuracy is an accuracy percentage selected by a user.

9. The memory storage of claim 6, wherein the instructions further cause the processor to provide the scheduler a latency threshold for a given application and an input video frame rate, and further cause the processor to run the scheduler to output an indication of deep learning model size for a deep learning model of the given application based upon the latency threshold and video frame rate.

10. A device comprising:
a local memory of the device having at least one multi-capacity neural network stored thereon;
at least one local processor operatively coupled to the memory;
at least one input operatively connected to the processor;
wherein the memory has stored thereon a set of instructions which, when executed by the processor, cause the processor to:
provide at least one runtime computing resource condition to a resource-aware scheduler;
run the resource-aware scheduler;
determine from an output of the resource-aware scheduler whether to page in to a short-term memory of the local memory or page out to a long-term memory of the local memory a set of filters of the multi-capacity neural network based on the at least one runtime computing resource condition; and
via the resource-aware scheduler, load from memory and execute a descendant of the multi-capacity neural network.

11. The device of claim 7, further comprising at least one sensor to obtain data from an external environment of the device, and wherein the instructions further cause the processor to provide a characteristic of the data to the resource-aware scheduler.

12. The device of claim 9, wherein the sensor is a video camera, and wherein the characteristic of the data is a frame rate and resolution of the data from the video camera, and further wherein the resource-aware scheduler provides an indication to the processor to page-out the set of filters from the multi-capacity neural network based upon the frame rate and resolution.

13. The device of claim 12, wherein subsequent to paging-out the set of filters, the resource-aware scheduler provides an indication to the processor to page-in a sub-set of the set of filters from the multi-capacity neural network based upon an availability of computational resources of the device.

14. The device of claim 10, to determine whether to page in or page out a set of filters of the multi-capacity neural network, the instructions cause the processor to:
determine whether:
page in to the short-term memory a first set of filters of the multi-capacity neural network when the at least one runtime computing resource condition indicates a first available resource; or
page out to the long-term memory a second set of filters of the multi-capacity neural network when the at least one runtime computing resource condition indicates a second available resource, the first available resource being larger than the second available resource.

15. A software development system comprising:
at least one server processor of a network in communication with a user computer;
at least one memory in communication with the at least one server processor, having stored thereon a set of instructions which, when executed by the server processor, cause the server processor to:
receive a request from the user computer;
in response to the request from the user computer, obtain a deep learning model;
transform the deep learning model into a multi-capacity deep learning model, wherein the multi-capacity model has an architecture allowing for adaptive model compression and recovery during runtime by paging in to short-term memory a first set of filters of the deep learning model or page out to long-term memory a second set of filters from the deep learning model based on a runtime computing resource condition; and
send the multi-capacity deep learning model to the user computer.

16. The system of claim 15, wherein the request from the user computer comprises a training data set and a desired machine learning task, and wherein the instructions further cause the server processor to train the multi-capacity deep learning model using the training data set to accomplish the desired machine learning task.

17. The system of claim 15, wherein the multi-capacity deep learning model comprises a minimum descendant model, at least one interim descendant model, and a maximum model.

18. The system of claim 17, wherein a majority of filters of the minimum descendant model form part of the interim descendant model, and a majority of filters of the interim descendant model form part of the maximum model.

19. The system of claim 15, wherein the instructions further cause the processor to send to the user at least one executable application file that comprises the multi-capacity deep learning model.

20. The system of claim 19, wherein the instructions further cause the processor to send a runtime scheduler application configured to run in association with the at least one executable application file, to determine whether, at runtime, a descendant model of the multi-capacity deep learning model should be utilized rather than a full version of the multi-capacity deep learning model.

21. The system of claim 20, wherein the runtime scheduler application is programmed to determine use of a descendant model of the multi-capacity deep learning model based upon at least one of runtime computational resources, a latency threshold, an inference accuracy threshold, or a characteristic of an input to the multi-capacity deep learning model.

* * * * *

UNITED STATES PATENT AND TRADEMARK OFFICE
CERTIFICATE OF CORRECTION

PATENT NO. : 12,008,462 B2
APPLICATION NO. : 17/267467
DATED : June 11, 2024
INVENTOR(S) : Mi Zhang et al.

Page 1 of 1

It is certified that error appears in the above-identified patent and that said Letters Patent is hereby corrected as shown below:

In the Claims

Column 28, Claim 6, Line 56, "determine a optimal" should be --determine an optimal--.

Column 29, Claim 11, Line 32, "claim 7" should be --claim 10--.

Column 29, Claim 12, Line 37, "claim 9" should be --claim 11--.

Signed and Sealed this
Thirteenth Day of May, 2025

Coke Morgan Stewart
*Acting Director of the United States Patent and Trademark Office*